(12) United States Patent
Dai et al.

(10) Patent No.: US 12,031,754 B2
(45) Date of Patent: Jul. 9, 2024

(54) COATING WITH SMART SUB-AMBIENT RADIATIVE COOLING

(71) Applicant: THE HONG KONG POLYTECHNIC UNIVERSITY, Hong Kong (CN)

(72) Inventors: Jianguo Dai, Hong Kong (CN); Xiao Xue, Hong Kong (CN); Dangyuan Lei, Hong Kong (CN); Meng Qiu, Hong Kong (CN); Wei Jin, Hong Kong (CN)

(73) Assignee: THE HONG KONG POLYTECHNIC UNIVERSITY, Hong Kong (CN)

( * ) Notice: Subject to any disclaimer, the term of this patent is extended or adjusted under 35 U.S.C. 154(b) by 384 days.

(21) Appl. No.: 16/949,417

(22) Filed: Oct. 29, 2020

(65) Prior Publication Data

US 2021/0131708 A1     May 6, 2021

Related U.S. Application Data

(60) Provisional application No. 62/927,756, filed on Oct. 30, 2019.

(51) Int. Cl.
*F25B 23/00* (2006.01)
*C08K 3/013* (2018.01)
(Continued)

(52) U.S. Cl.
CPC ............ *F25B 23/003* (2013.01); *C08K 3/013* (2018.01); *C08K 3/22* (2013.01); *C08K 7/28* (2013.01);
(Continued)

(58) Field of Classification Search
CPC ............ B82Y 40/00; C08K 2003/2241; C08K 2003/328; C08K 2201/011; C08K 3/013; C08K 3/22; C08K 3/24; C08K 7/28; C09D 125/14; C09D 5/004; C09D 7/61; C09D 7/70; C09K 11/7734; F25B 23/003;
(Continued)

(56) References Cited

U.S. PATENT DOCUMENTS 3,547,671 A * 12/1970 Hitzemann ............ C01G 23/07
106/443
10,088,251 B2   10/2018 Raman et al.
(Continued)

FOREIGN PATENT DOCUMENTS

EP       3078722 A1 * 10/2016 ............... C09D 5/22
JP       58168671 A  * 10/1983

OTHER PUBLICATIONS

"The Study on Titanium Dioxide-Silica Binary Mixture Coated SrAl2O4:Eu2+, Dy3+ Phosphor as a Photoluminescence Pigment in a Waterborne Paint" to Jaberi et al. Feb. 2019 (Year: 2019).*
(Continued)

*Primary Examiner* — Shuangyi Abu Ali
(74) *Attorney, Agent, or Firm* — S&F/WEHRW

(57) ABSTRACT

A smart sub-ambient radiative cooling composition including $TiO_2$ particles; inorganic particles selected from the group consisting of $SiO_2$, $CaCO_3$, SiC, ZnO, $Al_2O_3$, ZnO, and mixtures thereof; fluorescent pigment particles; and a polymer useful for sub-ambient radiative cooling, methods of preparation, and use thereof.

19 Claims, 27 Drawing Sheets

(51) Int. Cl.
*C08K 3/22* (2006.01)
*C08K 7/28* (2006.01)
*C09D 5/33* (2006.01)
*C09D 7/40* (2018.01)
*C09D 7/61* (2018.01)
*C09D 125/14* (2006.01)
*C09K 11/77* (2006.01)
*B82Y 40/00* (2011.01)

(52) U.S. Cl.
CPC ............... *C09D 5/004* (2013.01); *C09D 7/61* (2018.01); *C09D 7/70* (2018.01); *C09D 125/14* (2013.01); *C09K 11/7734* (2013.01); *B82Y 40/00* (2013.01); *C08K 2003/2241* (2013.01); *C08K 2201/011* (2013.01)

(58) Field of Classification Search
CPC ........ G16B 20/00; G16B 20/20; G16B 20/40; G16B 30/00
See application file for complete search history.

(56) References Cited

U.S. PATENT DOCUMENTS

| | | | |
|---|---|---|---|
| 2003/0085383 A1* | 5/2003 | Burnell-Jones | C09K 11/02 252/301.36 |
| 2011/0041726 A1* | 2/2011 | Robb | C09D 7/61 106/287.19 |
| 2015/0275077 A1 | 10/2015 | Berdahl | |
| 2017/0342278 A1 | 11/2017 | Zalich et al. | |
| 2019/0086164 A1 | 3/2019 | Yang et al. | |

OTHER PUBLICATIONS

Raman, A. P., Anoma, M. A., Zhu, L., Rephaeli, E. and Fan, S. (2014). Passive radiative cooling below ambient air temperature under direct sunlight. Nature 515, 540-544.

Zhai, Y., Ma, Y., David, S. N., Zhao, D., Lou, R., Tan, G., Yang, R. and Yin. X. (2017). Scalable-manufactured randomized glass-polymer hybrid metamaterial for daytime radiative cooling. Science 355, 1062-1066.

Mandal, J., Fu, Y., Overvit, A., Jia, M., Sun, K., Shi, N., Zhou, H., Xiao, X., Yu, N. & Yang, Y. (2018). Hierarchically porous polymer coatings for highly efficient passive daytime radiative cooling. Science 362, 315-319.

Xue Ma, et al., "Effects of Stokes shift and Purcell enhancement on fluorescence-assisted radiative cooling" J. Mater. Chem. A, 2022,10, 19635-19640.

Office Action of CN 2020800764521 issued from the China National Intellectual Property Administration (CNIPA) on Oct. 12, 2023.

\* cited by examiner

COATING WITH SMART SUB-AMBIENT RADIATIVE COOLING

CROSS REFERENCE TO RELATED APPLICATIONS

This application claims the benefit of priority of U.S. Provisional Application No. 62/927,756 filed on Oct. 30, 2019, which is hereby incorporated by reference in its entirety.

BACKGROUND

Building cooling during hot weather, which provides human thermal comfort and improves health and productivity, is critically important to our society. The peak demands of building cooling in cities pose a great challenge to power grids and may cause power blackouts. Moreover, the refrigerant gases used in air conditioners are one of the largest contributors to greenhouse gas emissions. Passive cooling, e.g., cooling with no power input and without greenhouse gas emission, provides an attractive solution to alleviate the power demands as well as negative environmental impact of building cooling.

Recent theoretical and experimental demonstrations of sub-ambient daytime radiative cooling (SDRC) represent a breakthrough in realizing passive daytime cooling. These radiative cooling materials exploit the infrared transparency window of the atmosphere, in the wavelength range of 8-13 µm, to directly transmit heat from an object at ambient temperature, through blackbody radiation, to the cold outer space which has a temperature of 3 K (−270° C.). This radiation effect, in fact, is what causes one to feel chilly when staying outside in summer nights. However, to generate sub-ambient daytime cooling under direct sunlight using the same effect, the materials must overcome the heating generated by the direct sunshine. In order to realize that, daytime radiative cooling materials were designed, using various approaches, to reflect most of the sunlight such that the heat absorption from the sun is below the level of radiative cooling. Based on the above SDRC concept, very recently the fluid-mediated cooling system has been explored for use in building industry. However, the designs and fabrications of these SDRC coatings often rely on the use of sophisticated photonic microstructures, noble metal mirrors, metamaterials, or hazardous chemical processes, greatly limiting their practical large-scale building cooling applications. Additionally, the sub-ambient daytime cooling reported in these existing devices ranges from 2.1 to 6.0° C. under direct sunlight in different regions, and in general their night time cooling power is much stronger than the daytime one because of less heat input at night. The stronger nighttime cooing of these designs may result in an overcooling effect in cold winter (especially during the night time) when cooling is no longer needed (or heating is needed instead to keep the indoor thermal comfort). Finally, it will enlarge the diurnal temperature difference that may jeopardize the service life of building envelopes, because of the enlarged temperature variation, which can induce significant thermal stresses in the building structures.

One intriguing question facing the research community is that whether the commercially used building coating materials can be engineered to realize enhanced sub-ambient daytime cooling yet suppressed night time overcooling, i.e. a "smart" sub-ambient radiative cooling (SSRC) in an eco-friendly and cost-effective manner. Solar reflective cool roof coatings are the most widely used and effective materials for building cooling in hot climates. Through many decades of development efforts, a broad range of commercial building coating materials are now available. These materials are convenient to use in construction at low cost, and exhibit excellent durability, which are actually the practical barriers of transitioning the current SDRC technology for building cooling applications. However, conventional $TiO_2$-based cool roof coatings have a typical solar reflectance of approximately 85%, which is not sufficiently high to meet the stringent requirements of SDRC. Therefore, developing new physical concepts to engineer these conventional building coating materials represents a promising cost-effective pathway for achieving SSRC.

There thus exists a need for improved coating materials that address or overcome at least some of the aforementioned challenges.

SUMMARY

Provided herein are building coating materials that can be engineered at low cost and surprisingly generate enhanced daytime radiative cooling of 6° C. (7° C. on a scale-model building) under direct sunlight of 735 W/m² (4° C. at nighttime), yielding a daytime cooling power of 64.5 W/m². The SDRC design described herein is greatly different from the existing approaches in the literature. Even though the $TiO_2$ particles have a strong absorption in the ultra-violet region, through the addition of fluorescent materials, part of the absorbed solar energy is effectively converted to fluorescence emission to yield an improved effective solar reflectance (ESR), thus reducing the overall solar absorption. Additionally, the conventional building coating materials are formulated to possess a broad emissivity spectrum in the entire mid-infrared region instead of using the narrow spectrum matching that of the atmospheric transparency window. Thus, the passive cooling materials can access an additional cold source, the sky, which enhances cooling in daytime yet suppresses the excessive cooling at nighttime, creating the aforementioned SSRC. In addition to expanding SRDC design paradigms, our results remove the major barriers of existing SDRC systems that impede the large-scale practical applications in buildings.

In a first aspect, provided herein is a smart sub-ambient radiative cooling (SSRC) coating comprising $TiO_2$ particles; inorganic particles selected from the group consisting of $SiO_2$, $CaCO_3$, SiC, ZnO, $Al_2O_3$, ZnO, $BaSO_4$, $Si_3N_4$, and mixtures thereof; fluorescent pigment particles; and a polymer, wherein the SSRC coating has an broadband emissivity of about 0.90 between 3 to 50 µm.

In a first embodiment of the first aspect, provided herein is the SSRC coating of the first aspect, wherein the SSRC coating has an infrared emissivity of greater than 0.90 between 3 to 16 µm.

In a second embodiment of the first aspect, provided herein is the SSRC coating of the first aspect, wherein the $TiO_2$ particles comprise a rutile crystal structure, an anatase crystal structure, or a mixture thereof.

In a third embodiment of the first aspect, provided herein is the SSRC coating of the first aspect, wherein the inorganic particles comprise hollow glass microspheres.

In a fourth embodiment of the first aspect, provided herein is the SSRC coating of the third aspect of the first aspect, wherein the inorganic particles comprise hollow glass microspheres.

In a fifth embodiment of the first aspect, provided herein is the SSRC coating of the first aspect, wherein the fluorescent pigment particles comprise a rare earth metal doped LuPO$_4$, rare earth metal doped Sr$_2$MgSi$_2$O$_7$, rare earth metal doped CaAl$_2$O$_4$, rare earth metal doped MgAl$_2$O$_4$, rare earth metal doped BaAl$_2$O$_4$, rare earth metal doped SrAl$_2$O$_4$, or a mixture thereof.

In a sixth embodiment of the first aspect, provided herein is the SSRC coating of the fifth embodiment of the first aspect, wherein the rare earth metal is Eu and optionally one or more of co-dopants selected from the group consisting of Dy, Yb, and Tb.

In a seventh embodiment of the first aspect, provided herein is the SSRC coating of the first aspect, wherein the fluorescent pigment particles comprise SrAl$_2$O$_4$:Eu$^{2+}$,Dy$^{3+}$,Yb$^{3+}$.

In an eighth embodiment of the first aspect, provided herein is the SSRC coating of the first aspect, wherein the polymer comprises polystyrene, polyacrylate, polyalkylacrylate, polymethacrylate, polyalkylmethacrylate, polycarbonate, polyacryclic acid, polymethacrylic acid, and mixtures thereof, and copolymers thereof.

In a ninth embodiment of the first aspect, provided herein is the SSRC coating of the first aspect, wherein the polymer comprises poly(styrene-co-butylacrylate).

In a tenth embodiment of the first aspect, provided herein is the SSRC coating of the first aspect, further comprising a wetting agent, a dispersant agent, an antifoaming agent, a suspending agent, a levelling agent, a coalescent agent, water, or a mixture thereof.

In an eleventh embodiment of the first aspect, provided herein is the SSRC coating of the first aspect, wherein the TiO$_2$ particles; inorganic particles; fluorescent pigment particles; and the polymer are present in a mass ratio of 4-5:0.5-1.5:2-3:6-7, respectively.

In a twelfth embodiment of the first aspect, provided herein is the SSRC coating of the eleventh embodiment of the first aspect, wherein the SSRC coating has an infrared emissivity between 0.92-0.97 between 8 to 13 μm.

In a thirteenth embodiment of the first aspect, provided herein is the SSRC coating of the first aspect, wherein the TiO$_2$ particles comprise a rutile crystal structure; the inorganic particles comprise hollow glass microspheres; and the fluorescent pigment particles comprise SrAl$_2$O$_4$:Eu$^{2+}$,Dy$^{3+}$,Yb$^{3+}$.

In a fourteenth embodiment of the first aspect, provided herein is the SSRC coating of the thirteenth embodiment of the first aspect, wherein the SSRC coating has an infrared emissivity between 0.92-0.97 between 8 to 13 μm.

In a fifteenth embodiment of the first aspect, provided herein is the SSRC coating of the thirteenth embodiment of the first aspect, wherein the TiO$_2$ particles; the hollow glass microspheres; SrAl$_2$O$_4$:Eu$^{2+}$,Dy$^{3+}$,Yb$^{3+}$; and the polymer are present in a mass ratio of 4-5:0.5-1.5:2-3:6-7, respectively.

In a sixteenth embodiment of the first aspect, provided herein is the SSRC coating of the fifteenth embodiment of the first aspect, wherein the SSRC coating has an infrared emissivity of 0.94-0.96 between 8 to 13 μm.

In a seventeenth embodiment of the first aspect, provided herein is the SSRC coating of the fifteenth embodiment of the first aspect, further comprising a wetting agent, a dispersant agent, an antifoaming agent, a suspending agent, a levelling agent, a coalescent agent, water, or a mixture thereof.

In a second aspect, provided herein is a SSRC coating formulation comprising the SSRC coating of the first aspect and one or more solvents.

In a third aspect, provided herein is a method of applying the SSRC coating formulation of the second aspect to a surface of a substrate, the method comprising: applying the SSRC coating formulation to the surface of the substrate thereby forming a SSRC coating on the surface of the substrate; and optionally curing the SSRC coating.

SDRC provides a promising electricity- and cryogen-free pathway for global energy-efficiency. However, current SDRC systems require stringent surface designs, which are neither cost-effective nor eco-friendly, to selectively emit thermal radiation to outer space and simultaneously maximize solar reflectance. Here, we develop a generic method to upgrade the conventional building coating materials with a peculiar self-adaptive SDRC effect through combining particle scattering, sunlight-excited fluorescence and mid-infrared broadband radiation. We also theoretically prove that heat exchange with the sky can eliminate the use of resonant microstructures and noble metal mirrors in conventional SDRC, and also leads to enhanced daytime cooling yet suppressed night time overcooling. When exposed to direct sunlight, our upgraded coating over an aluminium plate can achieve 6° C. (7° C. on a scale-model building) below the ambient temperature under a solar intensity of 744 Wm$^{-2}$ (850 Wm$^{-2}$), yielding a cooling power of 64.5 Wm$^{-2}$. The results pave the way for practical large-scale applications of high-performance SDRC for human thermal comfort in buildings.

A conceptual illustration of fluorescence-enhanced smart sub-ambient radiative cooling (top) and cooling performance at the rooftop (lower-left) and over a scale-model building (lower-right) are depicted in FIG. 1.

The all-construction-materials-made coating converts part of the solar absorption to fluorescence emission and thus advantageously improves its effective solar reflectance to realize sub-ambient daytime radiative cooling.

The construction materials are formulated to possess simultaneously high reflectivity in the solar spectral region and enhanced broadband emissivity in the entire mid- and far-infrared region. Compared to the selective radiator utilizing solely the narrow atmospheric transparency window, the sky can be utilized as an additional cold source to enhance the cooling performance of the broadband radiator in daytime (6° C. reduction) while suppressing the cooling in nighttime (4° C. reduction).

The SSRC coating achieves 7° C. cooling on a scale-model building during noon hours and also demonstrates peculiar eco-friendly and highly-scalable features and exceptional weather resistance.

The active building cooling for keeping human thermal comfort is an energy-intensive activity, which is the biggest energy consumer in urban areas. Recently, SDRC represents a breakthrough in the passive cooling technology, which minimizes the solar absorption and maximizes the heat dissipation into the outer space. Here, we propose a subtle design concept combining particle scattering, sunlight-excited fluorescence and mid-infrared broadband radiation, by which conventional building coating materials can be engineered at low cost to realize SSRC. We demonstrate the wide applicability of our all-constructional-materials-based eco-friendly SSRC coating through both the device and field building model tests. The study opens up an innovative cost-effective avenue for achieving electricity-free building cooling through the advanced SSRC coating technology.

BRIEF DESCRIPTION OF DRAWINGS

The above and other objects and features of the present disclosure will become apparent from the following description of the disclosure, when taken in conjunction with the accompanying drawings, in which.

DETAILED DESCRIPTION

Figure 1:
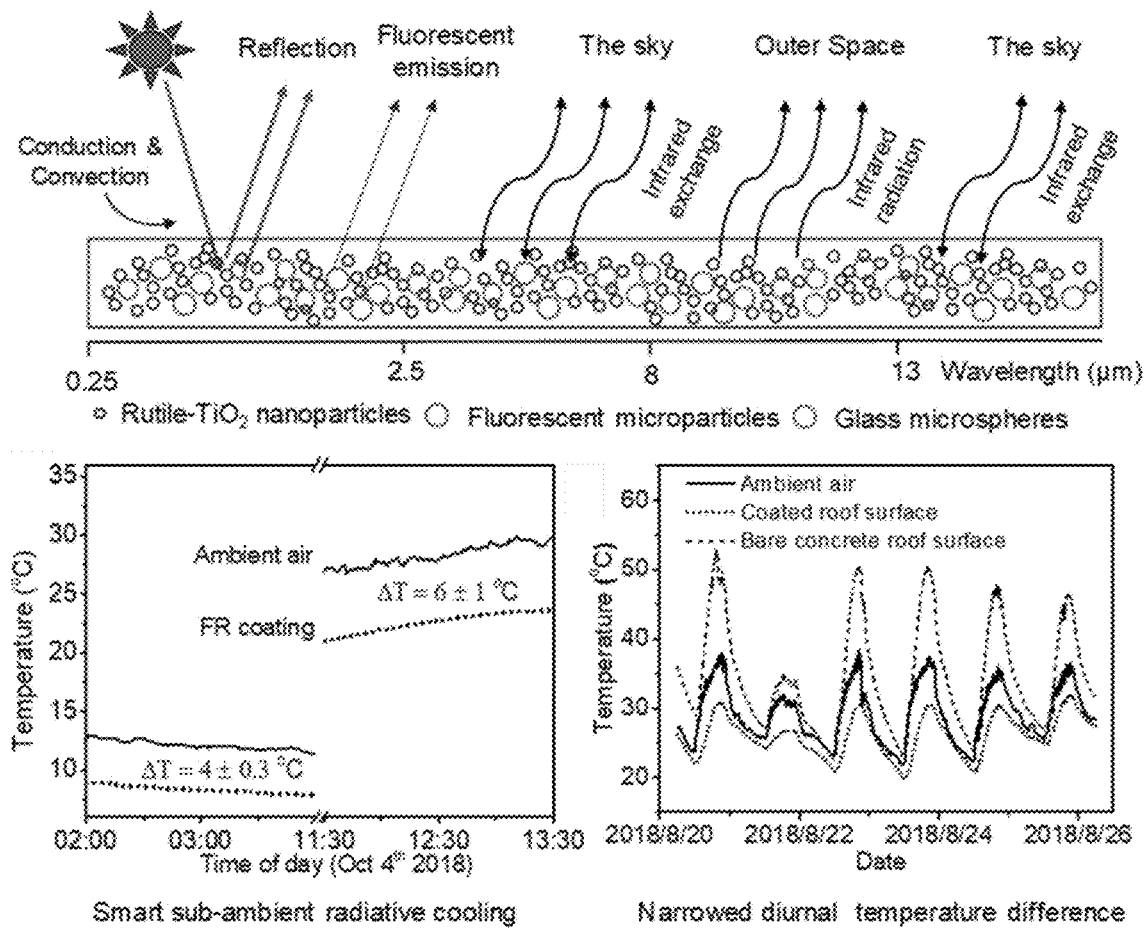
FIG. 1 depicts a conceptual illustration of fluorescence-enhanced smart sub-ambient radiative cooling (top) and cooling performance at the rooftop (lower-left) and over a scale-model building (lower-right).

Provided herein are SSRC coatings useful for sub-ambient radiative cooling. In certain embodiments, the SSRC coating comprises: $TiO_2$ particles; inorganic particles selected from the group consisting of $SiO_2$, $CaCO_3$, SiC, ZnO, $Al_2O_3$, ZnO, and mixtures thereof; fluorescent pigment particles; and a polymer, wherein the coating has an overall emissivity of overall emissivity of about 0.90 between 3 to 50 μm.

Advantageously, by combining the TiO$_2$ particles and the fluorescent pigment particles, the SSRC coatings can yield an effective solar reflectance of about 0.94 through the Purcell-effect enhanced fluorescent emission, and the wide particle size distribution of the inorganic particles can contribute to enhanced broadband emissivity of about 0.90 between 3 to 50 µm for the SSRC coatings described herein.

The TiO$_2$ particles can have a rutile crystal structure, an anatase crystal structure, or a mixture thereof. In certain embodiments, the TiO$_2$ particles are amorphous or substantially crystalline. The TiO$_2$ particles can have any shape including, but not limited to, spherical, hollow microspheres, ellipsoidal, polyhedral, rod-shaped, plate-shaped or irregular in shape.

The TiO$_2$ particles can range in size between 0.01 µm to 100 µm; 0.05 µm to 100 µm; 0.05 µm to 50 µm; 0.05 µm to 40 µm; 0.05 µm to 30 µm; 0.05 µm to 20 µm; or 0.05 µm to 10 µm. In certain embodiments, the TiO$_2$ particles have an average particle size between 0.1 µm to 1 µm; 0.1 µm to 0.9 µm; 0.1 µm to 0.8 µm; 0.1 µm to 0.7 µm; 0.1 µm to 0.6 µm; 0.1 µm to 0.5 µm; 0.2 µm to 0.5 µm; or 0.3 µm to 0.5 µm.

The TiO$_2$ particles can have a polydispersity index (PDI) of 0.08 to 0.5. TiO$_2$ particles having a wide particle size distribution advantageously provide a high reflectance throughout the solar spectrum region. In certain embodiments, the TiO$_2$ particles are rutile TiO$_2$ particles sold under the trademark Ti_pure™ R-902 by DuPont Chemicals Co., Ltd.

The inorganic particles can have any shape including, but not limited to, spherical, hollow microspheres, ellipsoidal, polyhedral, rod-shaped, plate-shaped or irregular in shape. In certain embodiments, the inorganic particles are hollow microspheres.

The inorganic particles can range in size between 1 µm to 200 µm; 1 µm to 180 µm; 1 µm to 160 µm; 1 µm to 150 µm; or 10 µm to 150 µm.

In certain embodiments, the inorganic particles comprise glass particles. The glass particles can be hollow glass microspheres. In certain embodiments, the inorganic particles comprise hollow glass microspheres with a particle size D10 of ≤22-35 µm, D50 of ≤40-65 µm, and D90≤70-120 µm. In certain embodiments, the hollow glass microspheres are sold under the name Hollow Glass Microspheres H20, H25, H32, H38Hs, H40, H46, or H60 supplied by Sinosteel Maanshan New Material Technology Co., Ltd™; or glass hollow microspheres sold under the name 3M™ Glass Bubbles K15, Glass Bubbles K20, Glass Bubbles K25, or Glass Bubbles S15, supplied by 3M™; or mixtures thereof.

The fluorescent pigment particles may comprise any organic or inorganic fluorescent material. In certain embodiments, the fluorescent pigment particles comprise ZnS:Cu, ZnS:Ag, (Zn,Cd)S:Cu, (Ca,Sr)S:Bi, rare earth metal doped LuPO$_4$, rare earth metal doped Sr$_2$MgSi$_2$O$_7$, rare earth metal doped CaAl$_2$O$_4$, rare earth metal doped MgAl$_2$O$_4$, rare earth metal doped BaAl$_2$O$_4$, rare earth metal doped SrAl$_2$O$_4$, and mixtures thereof. MAl$_2$O$_4$ doped with one or more rare earth metals, such as Eu$^{2+}$, wherein M can be Ca, Ba, Sr, or mixtures thereof provide safe, chemically stable, very bright, and exhibit long-afterglow photoluminescence. Making rare earth metal doped MAl$_2$O$_4$ particles useful fluorescent pigment particles in the SSRC coatings described herein. Depending on the molar ratio of CaO, MgO, or SrO in the Al$_2$O$_3$ different aluminate structures may exist alone or as a mixture. For example, SrO may form various strontium aluminates with Al$_2$O$_3$, such as SrAl$_{12}$O$_{19}$, SrAl$_4$O$_7$, Sr$_4$Al$_{14}$O$_{25}$, SrAl$_2$O$_4$ and Sr$_3$Al$_2$O$_6$. Likewise, CaO may form various strontium aluminates with Al$_2$O$_3$, such as CaAl$_2$O$_4$, CaAl$_4$O$_7$, CaAl$_{12}$O$_{19}$, Ca$_3$Al$_2$O$_6$, and Ca$_{12}$Al$_{14}$O$_{33}$. All such strontium, calcium, and magnesium aluminates and mixed phases thereof when doped with one or more rare earth metals may be used as fluorescent pigment particles in the SSRC coatings described herein. In certain embodiments, the rare earth metal doped MAl$_2$O$_4$ particles further comprise B or Mn.

The one or more rare earth metal can be selected from the group consisting of Eu, Ce, Dy, Er, Gd, Sm, Tb, Nd, Pr, La, Ho, Yb, and Lu. The one or more rare earth metals may be in the +1, +2, or +3 oxidation state.

In certain embodiments, the rare earth metal doped LuPO$_4$, rare earth metal doped Sr$_2$MgSi$_2$O$_7$, rare earth metal doped CaAl$_2$O$_4$, rare earth metal doped MgAl$_2$O$_4$, rare earth metal doped BaAl$_2$O$_4$, rare earth metal doped SrAl$_2$O$_4$ are doped with Eu2+ and optionally one or more other rare earth metals.

In certain embodiments, the fluorescent pigment particles comprise LuPO$_4$:Eu/Dy/Tb; SrAl$_2$O$_4$:Eu/Dy/Tb; Sr$_2$MgSi$_2$O$_7$:Eu/Dy/Tb, ZnS:Cu; ZnS:Ag; (Zn,Cd)S:Cu, and (Ca,Sr)S:Bi. In certain embodiments, the fluorescent pigment particles comprise SrAl$_2$O$_4$:Eu$^{2+}$,Dy$^{3+}$,Yb$^{3+}$. Other exemplary fluorescent pigment articles include, but are not limited to SrAl$_2$O$_4$:Eu$^{2+}$,Dy$^{3+}$; Sr$_4$Al$_{14}$O$_{25}$:Eu$^{2+}$,Dy$^{3+}$; CaAl$_2$O$_4$:Eu$^{2+}$,Nd$^{3+}$; BaAl$_2$O$_4$:Eu$^{2+}$,Pr$^{3+}$; and MgAl$_2$O$_4$:Eu$^{2+}$,Nd$^{3+}$.

The fluorescent pigment particles can have any shape including, but not limited to, spherical, ellipsoidal, polyhedral, rod-shaped, plate-shaped or irregular in shape.

The fluorescent pigment particles can range in size between 1 µm to 200 µm; 1 µm to 180 µm; 1 µm to 160 µm; 1 µm to 150 µm; or 10 µm to 150 µm. In certain embodiments, the fluorescent pigment particles have an average particle size between 20 µm to 70 µm.

In certain embodiments, the fluorescent pigment particles down-convert the wavelength of incident light with peak wavelengths shorter than 450 nm to that of the emission light ranging from 500 to 700 nm.

The SSRC coating may comprise one or more polymers. The selection of the polymer can depend on the physical, chemical, optical, and thermal properties required for the specific application. Exemplary polymers useful in the SSRC coating described herein include one or more polymers selected from the group consisting of polymer comprises polystyrene, polyacrylate, polyalkylacrylate, polymethacrylate, polyalkylmethacrylate, polycarbonate, polyacrylic acid, polymethacrylic acid, and mixtures thereof, and copolymers thereof. In certain embodiments, the polymer is a polyacrylate emulsion, a poly-silicone-acrylate emulsion, a poly-styrene-acrylate emulsion, and mixtures thereof.

The self-cleaning properties of the SSRC coating can be improved by the incorporation of a hydrophobic polymer, such as polymer emulsions sold under the trademark Acronal® ECO 702 AP by BASF SE™.

The polymer may be a homopolymer or a copolymer selected from alternating copolymers, random copolymers, regiorandom copolymers, regioregular copolymers, or block copolymers.

In certain embodiments, the polymer is a poly(styrene-co-alkylacrylate) polymer or a poly(styrene-co-acrylic) polymer. The poly(styrene-co-alkylacrylate) polymer may include poly(styrene-co-C$_1$-C$_{10}$alkylacrylate) polymers; poly(styrene-co-C$_1$-C$_8$alkylacrylate) polymers; poly(styrene-co-C$_1$-C$_6$alkylacrylate) polymers; poly(styrene-co-C$_2$-

$C_6$alkylacrylate) polymers; poly(styrene-co-$C_1$-$C_4$alkylacrylate) polymers; or poly(styrene-co-$C_3$-$C_5$alkylacrylate) polymers.

The SSRC coating may comprise $TiO_2$ particles; inorganic particles; and fluorescent pigment particles are present in a mass ratio of 4-5:0.5-1.5:2-3, respectively. In certain embodiments, the SSRC coating may comprise $TiO_2$ particles; inorganic particles; and fluorescent pigment particles are present in a mass ratio of 4-5:0.5-1.5:2-3; 4.25-4.75: 0.75-1.25:2.25-2.75; 4.50-4.75:0.9-1.1:2.4-2.6; or 4.6-4.7: 0.9-1.1:2.4-2.6, respectively The SSRC coating may comprise $TiO_2$ particles; inorganic particles; fluorescent pigment particles; and the polymer are present in a mass ratio of 4-5:0.5-1.5:2-3:6-7, respectively. In certain embodiments, the SSRC coating comprises $TiO_2$ particles; inorganic particles; fluorescent pigment particles; and the polymer are present in a mass ratio of 4.25-4.75:0.75-1.25:2.25-2.75:6.25-6.75; 4.50-4.75: 0.9-1.1:2.4-2.6:6.5-6.75; or 4.6-4.7:0.9-1.1:2.4-2.6:6.6-6.7, respectively.

The SSRC coating may further comprise one or more additives selected from the group consisting of a wetting agent, a dispersant agent, an anti-foaming agent, a suspending agent, a levelling agent, a coalescent agent, water, and mixtures thereof. Additional exemplary additives of the SSRC coating include, but are not limited to, stabilizers, dispersants, surfactants, paraffins, waxes, UV light stabilizers, rheology modifiers, mildewcides, biocides, fungicides, and other conventional additives.

The wetting agent may comprise one or more non-ionic surfactants. Exemplary non-ionic surfactants include, but are not limited to, polyoxyethylene octyl phenol (such as Triton X-100); alkylphenoxypolyethoxy (3) ethanol, polyoxyethylene (20) sorbitan monolaurate (Tween 20), polyoxyethylene (20) sorbitan monopalmitate (Tween 40), polyoxyethylene (20) sorbitan monostearate (Tween 60), polyoxyethylene (20) sorbitan tristearate (Tween 65), polyoxyethylene (20) sorbitan monooleate (Tween 80), polyoxyethylene (20) sorbitan trioleate (Tween 85), polyoxyethylene (20) palmitate (G2079), polyoxyethylene (20) lauryl ether; polyoxyethylene (23), polyoxyethylene (25) hydrogenated castor oil (G1292) and polyoxyethylene (25) oxypropylene monostearate (G2162). In certain embodiments, the wetting agent is a polyoxyethylene octyl phenol sold under the trademark Triton™ X-100 by DOW®.

The dispersant agent may comprise one or more anionic surfactants. Exemplary anionic surfactants include, but are not limited to, alkyl carboxylates, alkylether carboxylates, polyacrylates, N-acylaminoacids, N-acylglutamates, N-acylpolypeptides, alkylbenzenesulfonates, paraffinic sulfonates, α-olefinsulfonates, lignosulfates, derivatives of sulfosuccinates, polynapthylmethylsulfonates, alkyl sulfates, alkylethersulfates, monoalkylphosphates, polyalkylphosphates, fatty acids, alkali salts of acids, alkali salts of fatty acids, alkaline salts of acids, sodium salts of acids, sodium salts of fatty acid, alkyl ethoxylate, and soaps. In certain embodiments, the dispersant agent is a metal polyacrylate, such as sodium polyacrylate.

The anti-foaming agent may comprise a $C_{12}$-$C_{30}$ alkyl alcohol, such as iso-octadecanol or dodecanol, a silicone derivative, such as an alkylated silicone, a polydimethylsiloxane, or a polyalkylsiloxane, or a mixture thereof.

The suspending agent may comprise a poly(ethylene glycol ether) copolymer.

The coalescent agents include agent that is useful in inducing SSRC coating to form a condensed membrane at lower temperature. In certain embodiments, the coalescent agent is an alcoholic ether compound.

The SSRC coating may comprise up to 10% by weight of the one or more additives. In certain embodiments, the SSRC coating comprises up to 9%, up to 8%, up to 7%, up to 6%, or up to 5% by weight of the one or more additives.

The SSRC coating described herein can have an overall emissivity of about 0.90 between 3 to 50 µm; and an infrared emissivity greater than 0.90 between 8 to 13 µm. In certain embodiments, the SSRC coating has an infrared emissivity between 0.90-0.97; 0.91-0.97; 0.91-0.96; 0.92-0.96; 0.93-0.96; 0.94-0.96; or 0.95-0.96 between 8 to 13 µm.

The SSRC coating may be applied to a surface of a substrate by deposition of a SSRC coating formulation comprising the SSRC coating and one or more solvents. The SSRC coating formulation may be a suspension, emulsion, or mixture. The solvent can be water, alcohols, ethers, esters, ketones, formamides, carbonates, alkanes, aromatic solvents or mixtures thereof. Exemplary solvents include, but are not limited to, water, ethyl alcohol, dimethylformamide, xylene, toluene, mineral spirits, a mixture of aliphatic carbons, methyl ethyl ketone, methyl isobutyl ketone butyl acetate; and 1-methoxy-2-propylacetate. The SSRC coating formulation may comprise up to 10%, up to 9%, up to 8%, up to 7%, up to 6%, or up to 5% by weight of the solvent. In certain embodiments, the solvent is water. In instances in which the solvent is water, the polymer may exist as a water based emulsion, such as a water-based emulsion comprising poly(styrene-co-alkylacrylate) polymer or a poly(styrene-co-acrylic) polymer.

The SSRC coating formulation can be readily prepared using any number of conventional methods known in the art. In certain embodiments, the method for preparing the SSRC coating formulation comprises: mixing the $TiO_2$ particles, the inorganic particles, the polymer, the fluorescent pigment particles, solvent, and optionally one or more additives thereby forming the SSRC coating formulation.

In certain embodiments, the method for preparing the SSRC coating formulation comprises: mixing the $TiO_2$ particles, the polymer, the fluorescent pigment particles, and solvent thereby forming a first mixture; optionally one or more additives to the first mixture; adding the inorganic particles and optionally one or more additives thereby forming the SSRC coating formulation.

In certain embodiments, the method for preparing the SSRC coating formulation comprises: combining the $TiO_2$ particles, the polymer, the fluorescent pigment particles, and solvent thereby forming a first mixture; adding a wetting agent, dispersant, antifoaming agent, and suspending agent to the first mixture thereby forming a second mixture; adding the inorganic particles, antifoaming agent, and coalescent agent thereby forming the SSRC coating formulation.

The method for applying the SSRC coating to a surface of a substrate can comprise: applying a coating of the SSRC coating formulation to the surface of the substrate thereby forming a SSRC coating on the surface of the substrate; and optionally curing the SSRC coating.

The SSRC coating formulation can be applied to a surface of a substrate using any method known in the art, such as spin coating, printing, print screening, spraying, painting, brushing, and dip coating. The SSRC coating formulation described herein can be applied to a surface of a substrate using a brush, blade, roller, sprayer (for example, air-assisted or airless, electrostatic), vacuum coater, curtain coater, flood coater, or any other means known in the art. In certain embodiments, the surface of the substrate is pretreated by application of a coating of a primer coating comprising the SSRC coating formulation, which has been diluted by e.g., a factor ½, ⅕, or 1/10 of the concentration of the SSRC coating formulation concentration. Advantageously, the pre-treatment of the surface of substrates with micro cracks and/or roughness, such as concrete or wood, with the primer coating can impregnate the primer into the substrate to facilitate better bonding between the primer treated substrate and the SSRC coating formulation.

Once applied to a surface, the SSRC coating composition can optionally be cured by heating the SSRC coating composition at a temperature between 23° C. and 160° C. In certain embodiments, the SSRC coating composition is allowing the SSRC coating composition to stand at a temperature between 20° C. and 30° C. for 1 to 2 hours.

The SSRC coating formulation can be applied to a wide variety of surfaces such as, for example, the surface of substrates composed of paper, wood, concrete, cement, asphalt, metal (e.g., steel, aluminum alloy, etc), glass, gypsum, ceramic, ceramic tiles, plastic, plaster, masonry, resin, and roofing substrates such as asphaltic coatings, roofing felts, foamed polyurethane insulation; or to previously painted, primed, undercoated, worn, or weathered substrates. In certain embodiments, the SSRC coating formulation is applied to the exterior walls and/or roof of a commercial, industrial, or residential building, or to the exterior and/or interior surface of an automobile.

In general, the fundamental thermal processes involved in a typical SDRC device at temperature T can be grouped into four sources, as expressed in Eq. (1) below:

$$P_{cool}(T) = P_{rad}(T) - P_{sun} - P_{atm} - P_{cond+conv} \quad (1)$$

where $P_{rad}(T)$, $P_{sun}$ and $P_{atm}$ are the thermal radiation, solar absorption and atmospheric longwave radiation absorbed by the device, respectively, and $P_{cond+conv}$ is the device's heat convection and conduction with the surrounding environment. These items can be expressed as:

$$P_{sun} = \int A_{RC}(\lambda) I_{sun}(\lambda) d\lambda \quad (2)$$

$$P_{rad} = \int A_{RC}(\lambda) B(\lambda, T) d\lambda \quad (3)$$

$$P_{atm} = \int A_{RC}(\lambda) DLR(\lambda) d\lambda \quad (4)$$

where $A_{RC}(\lambda)$ is the absorptivity spectrum of the device, $I_{sun}$ is the solar spectrum, $B(\lambda, T)$ is the hemispherical blackbody radiation power spectrum at T, $DLR(\lambda)$ is the atmospheric downward longwave radiation flux spectrum. In the existing SDRC designs in the literature, $P_{sun}$ is minimized by designing materials and/or structures with high solar reflectance. In addition, due to the narrow emissivity spectrum of these designs, $P_{rad}(T)$ and $P_{atm}$ are limited to the atmospheric transparency window of 8-13 μm, beyond which the radiative heat exchange is strongly suppressed.

Figure 7:
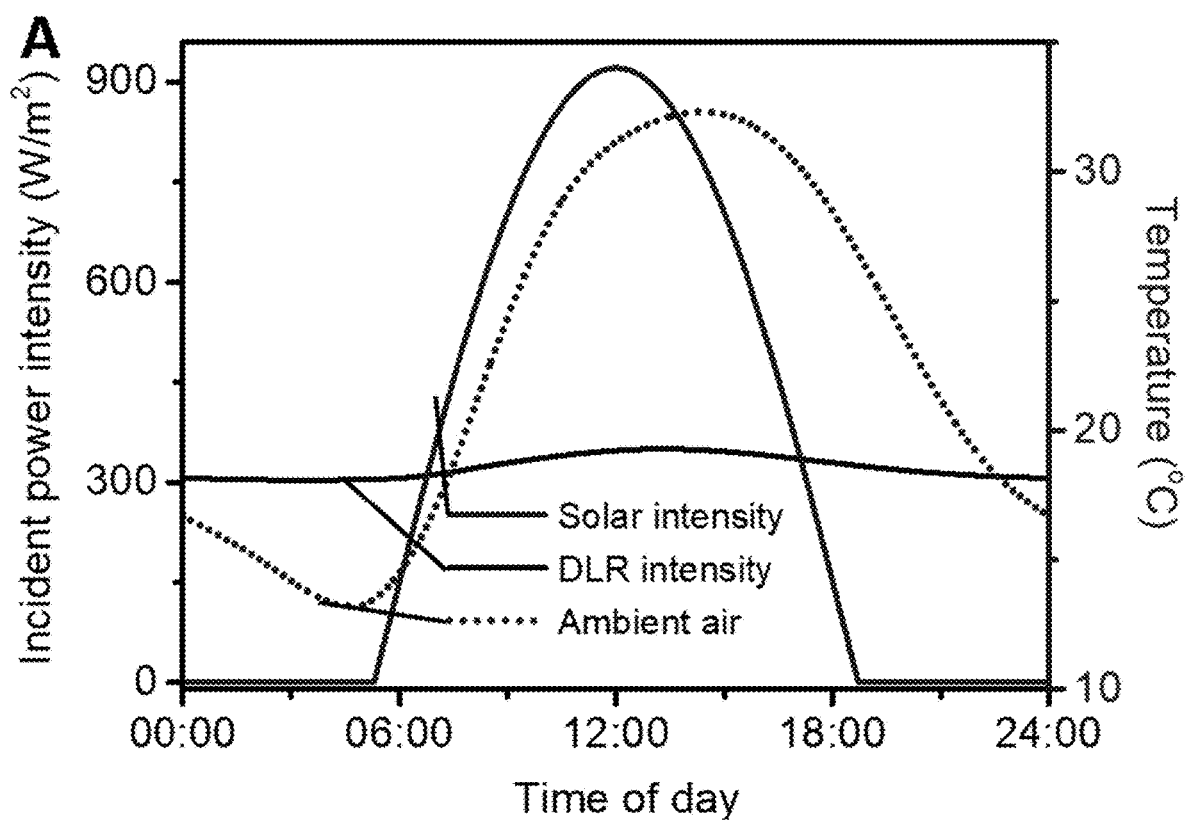
FIG. 7 depicts meteorological data for a typical late summer sunny day in Beijing: Solar irradiance, DLR and ambient air temperature obtained from the mean smoothened data of our measurements. (B) Typical DLR flux spectrum during the test period (www.spectralcalC.com).
Figure 7:
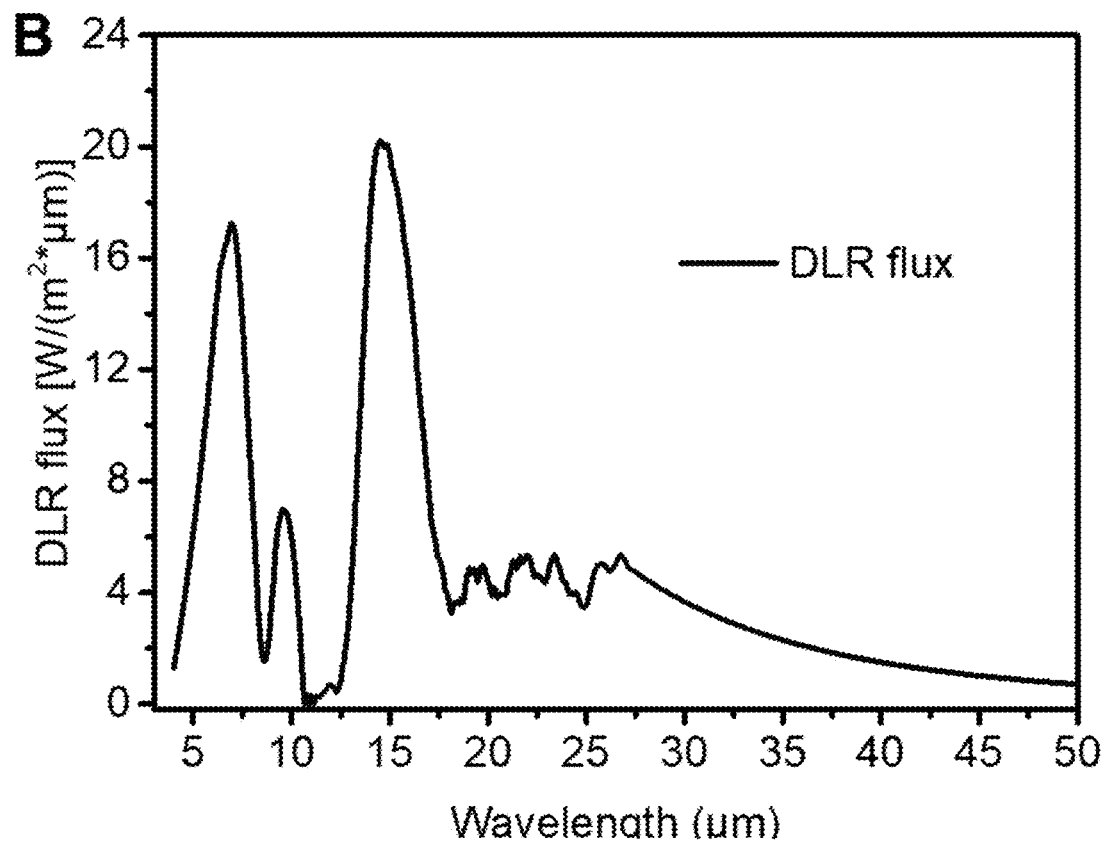

It is widely accepted that due to the limited radiation capacity, the steady-state temperature (when $P_{cool}(T)=0$) of the existing spectrum-selective SDRC designs is strongly affected by the parasitic thermal load. By extremely suppressing the parasitic heating of the environment (e.g. using a vacuum chamber), i.e., the convective coefficient $h_c$ approaches zero, a spectrum-selective SDRC device was reported to be able to achieve a temperature reduction of 42° C. With increasing $h_c$, which represents a more realistic working environment, however, the temperature reduction of the spectrum-selective SDRC design, with non-zero emissivity restricted to the wavelength range of 8-13 μm, may become inferior to that achieved by a broad spectrum SDRC design. This is mainly because there are substantial non-zero transmission coefficients of the sky outside the main transparency window of 8-13 μm. For example, in addition to the main transparency window, we note that the downward radiation is also weak around the wavelength range of 20-25 microns as shown in FIG. 7. Hence an emitter with a broader bandwidth may provide additional cooling power to enhance the SDRC effect to offset the parasitic thermal load.

Figure 2:
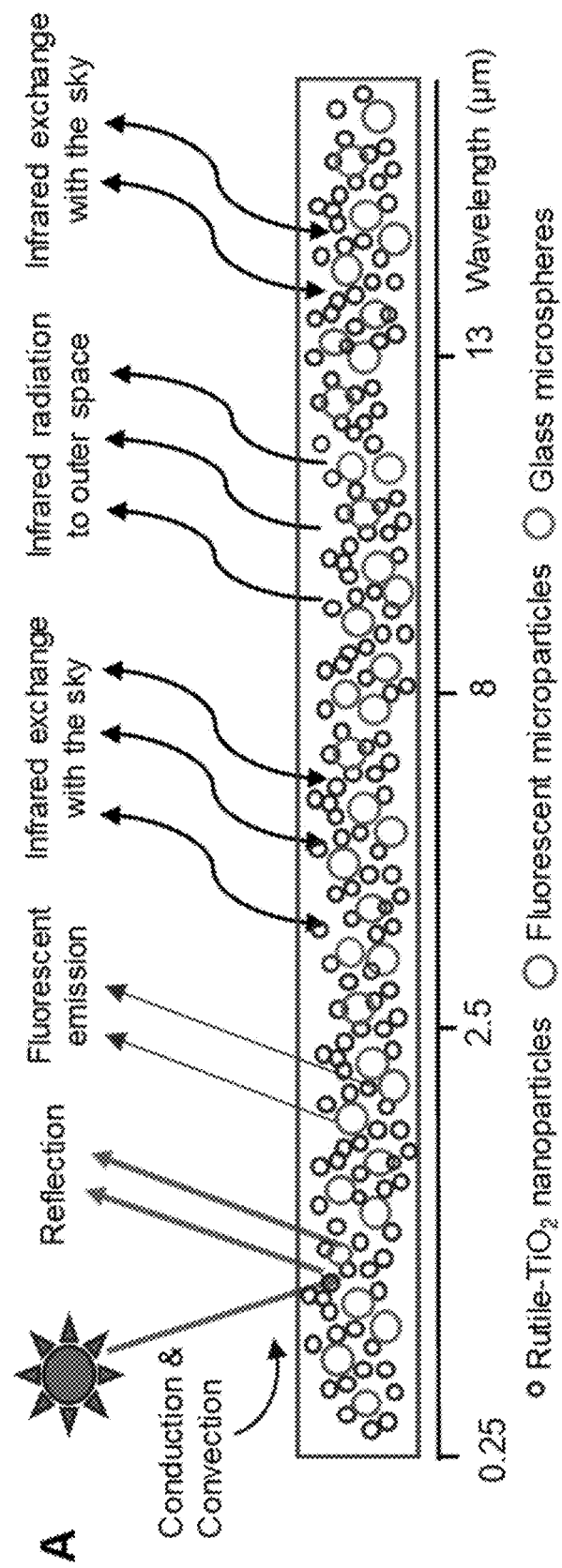
FIG. 2 depicts theoretical analysis of smart sub-ambient radiative cooling: (A) Schematics of the cooling mechanism of the designed coating. (B) Standard solar spectrum, $I_{AM1.5}$ ($\lambda$), transmittance spectrum of the atmosphere, $t_{atm}(\lambda)$, black-body radiation spectrum at 30° C., B($\lambda$, 30° C.), ideal absorptivity spectra, $A_{RC}(\lambda)$ of a selective radiator and a broadband radiator. (C) Cooling temperatures calculated with Eq. (1) for the broadband radiator and the selective radiator, in comparison with the measured ambient temperature. (D) Calculated $P_{rad}$–$P_{atm}$ for the broadband radiator and the selective radiator.
Figure 2:
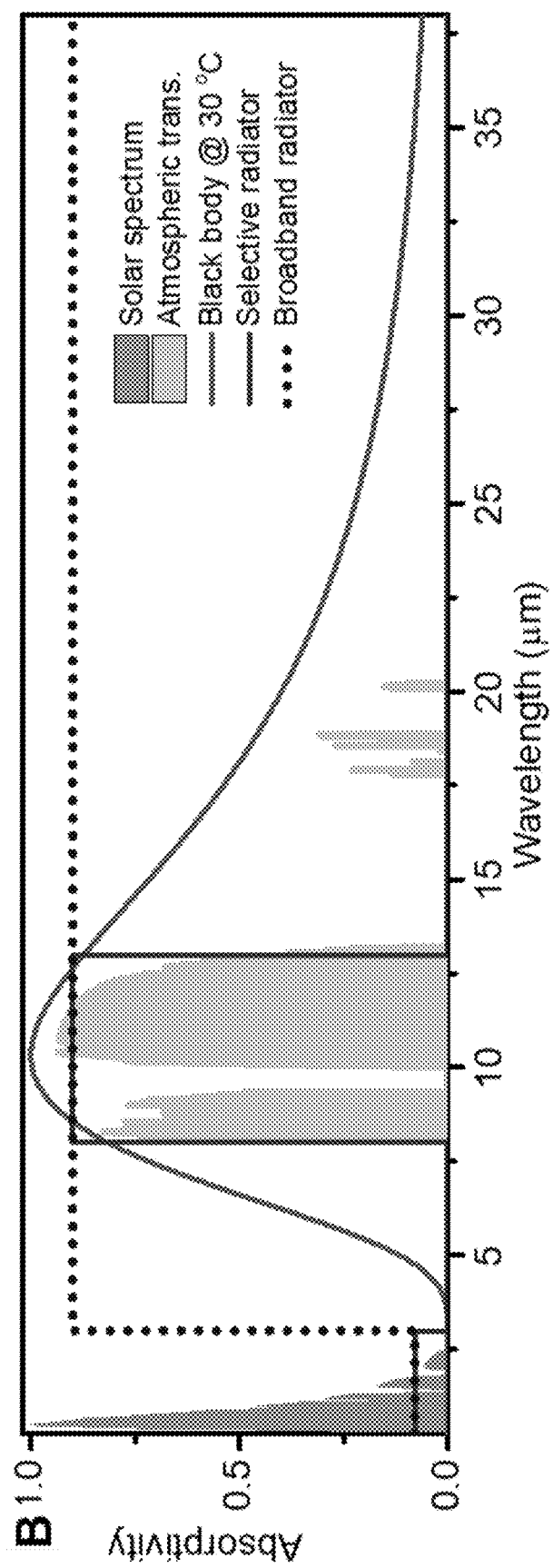
Figure 2:
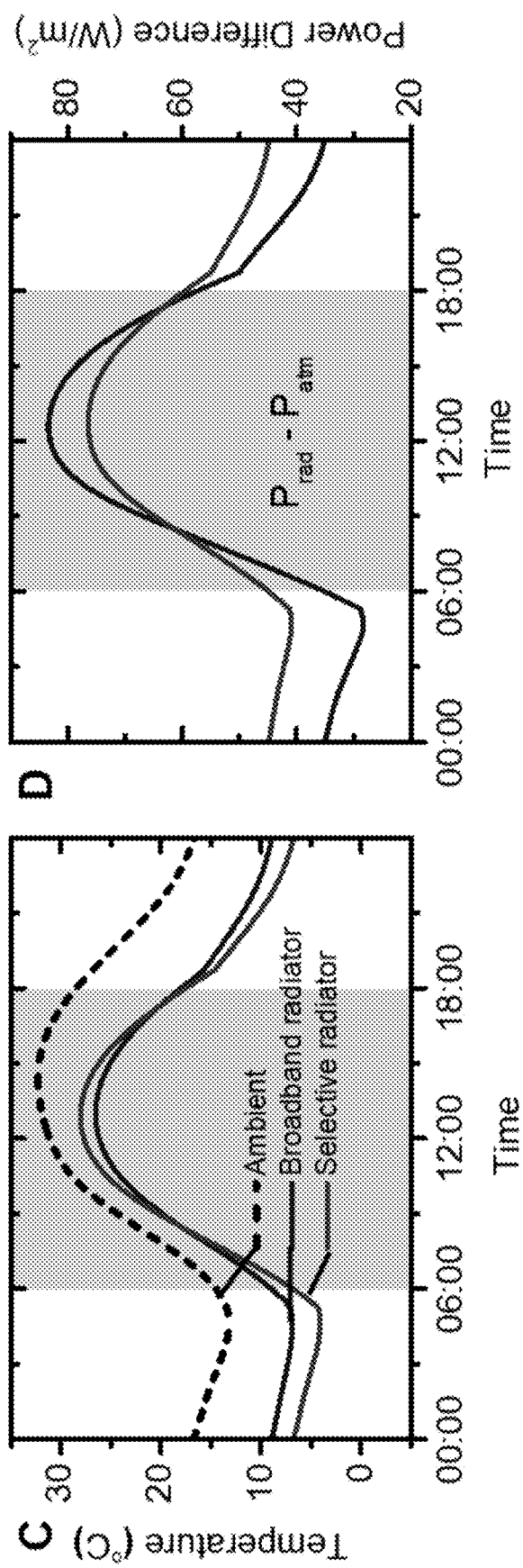

To quantify the effect of heat exchange with the sky (i.e. $P_{rad}-P_{atm}$) on the SDRC performance of the two types of radiators, we carry out theoretical calculations by assuming an ideal emissivity of 0.9 from 3 μm to 50 μm for the broadband radiator and the same emissivity from 8 μm to 13 μm for the selective radiator, respectively (see FIG. 2B). To compare the SDRC performance of the two radiators under real working conditions, we set the solar absorptivity as 6.6% and $h_c$ as 4.5 $Wm^{-2}K^{-1}$, respectively, as the experimentally achievable conditions. As a result of the above assumptions, the two radiators have the same $P_{sun}$ but different $P_{rad}-P_{atm}$. Subsequently, we calculate the cooling temperatures of both radiators according to the measured meteorological data (i.e., solar intensity and DLR intensity, see FIG. 7A) and the DLR flux spectrum (see FIG. 7B) for a typical late summer sunny day in Beijing. As shown in FIG. 2C, comparing with the ambient temperature (black dashed line), both radiators can achieve significant sub-ambient cooling during the entire day. However, the broadband radiator generates a cooling temperature to 26° C. at the noontime when cooling is needed, compared with 28° C. for the selective radiator. In the early morning (e.g., 2:00 a.m.) when cooling is no longer needed (e.g. the ambient air temperature is below 15° C.), the broadband and selective radiators generate cooling temperatures to 7° C. and 4° C., respectively. The above comparison reveals an essential difference between the two types of radiators, that is, the broadband radiator enhances radiative cooling in daytime yet suppresses overcooling at nighttime, leading to a narrowed diurnal temperature difference compared to the selective one. Such a difference can be attributed to the broadband radiator's stronger heat exchange capacity with the sky. At noon, the sky is colder than the coatings; therefore, the open-sky model induces further cooling. Conversely, at night, the sky is warmer than the coatings; thus, the open-sky model suppresses overcooling. FIG. 2D shows the variation of heat exchange with the sky for the two radiators during an entire day, indicating that the broadband radiator leads to a higher cooling power in daytime (e.g. 10:00 am-4:00 pm) yet a lower cooling power at nighttime (e.g. 7:00 pm-5:00 am). Note that we calculated $P_{atm}$ using the measured DLR intensity and reported DLR flux spectrum.

To fabricate the designed SSRC coating working in the framework of the broadband radiator, we choose commercially available polystyrene-acrylates emulsion as the matrix material, and $TiO_2$ powder and glass microspheres as the functional fillers. Their constructability allows us to mix them easily to form a building coating and be conveniently applied on building envelops.

Figure 8:
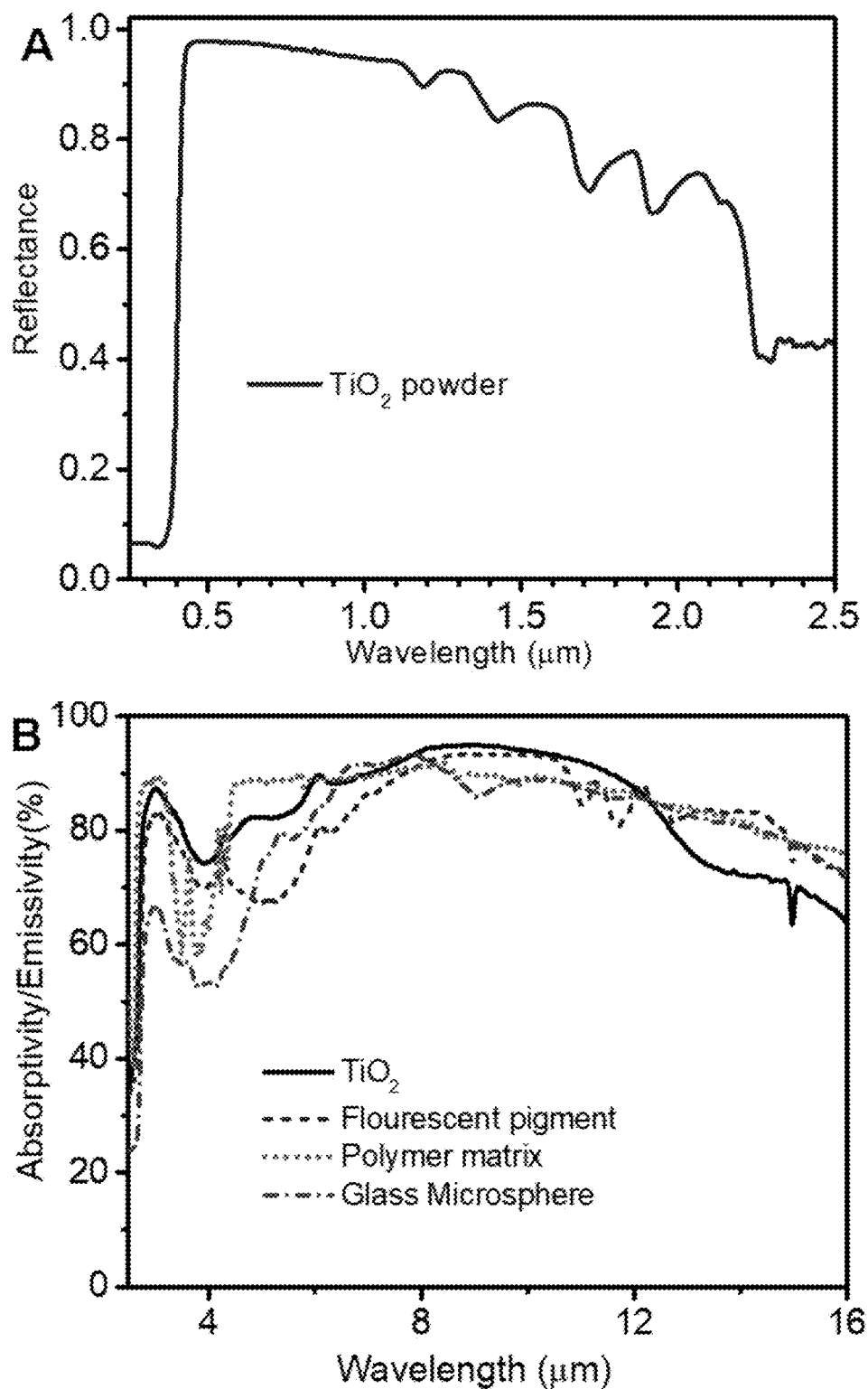
FIG. 8 depicts optical properties of raw materials and their composites: (A) Solar reflectance spectrum of the pristine $TiO_2$ rutile powder. Measured infrared emissivity spectra of (B) raw materials and (C) their composites.
Figure 8:
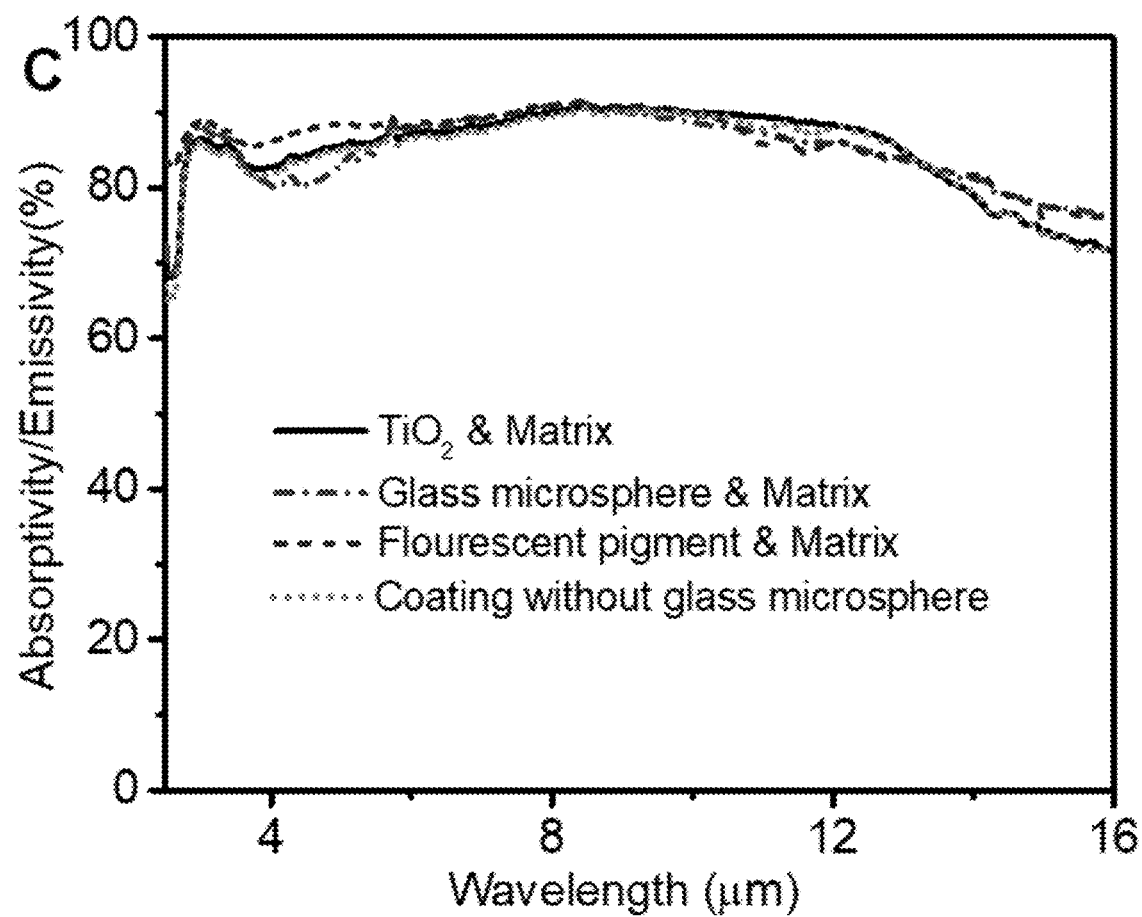
Figure 9:
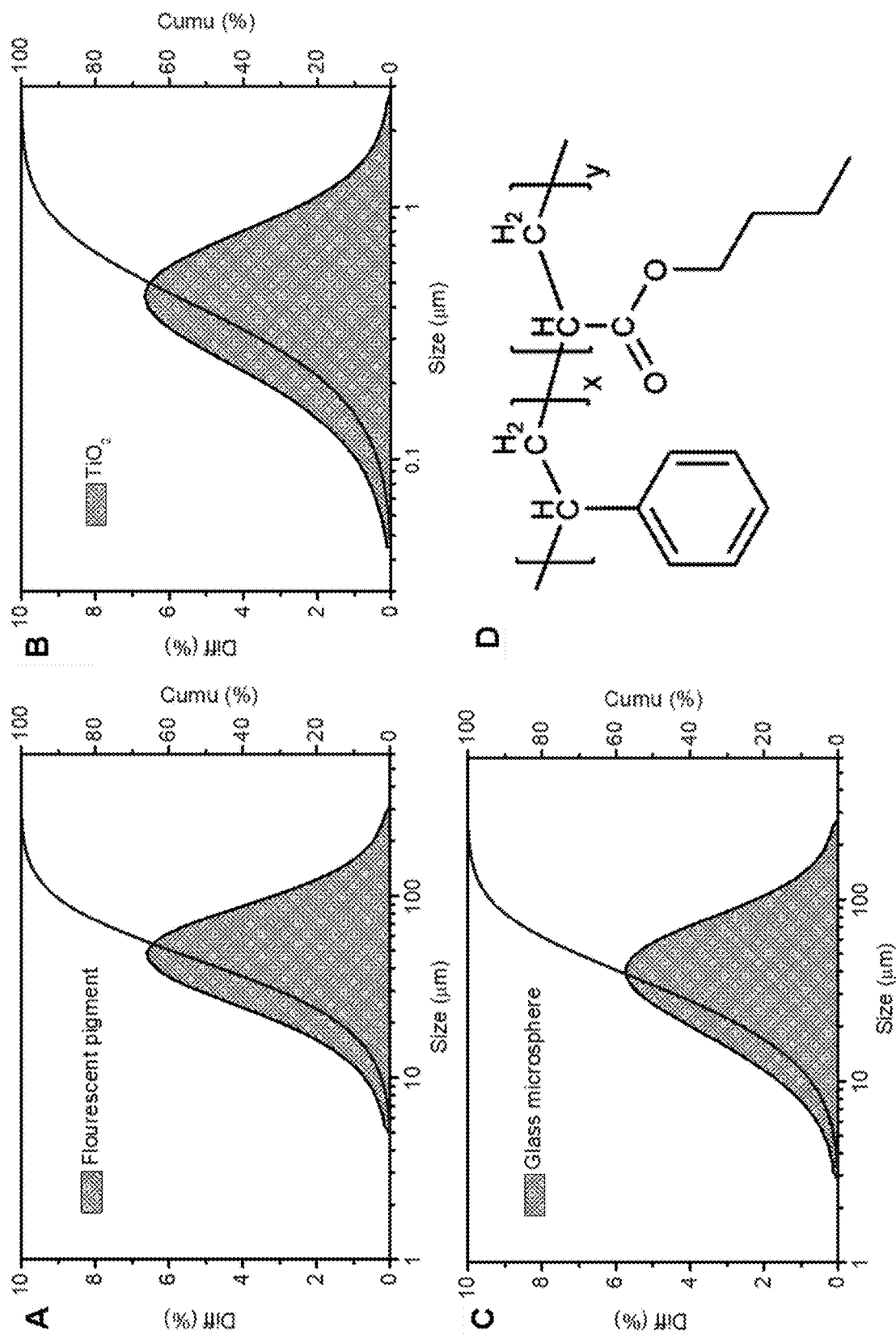
FIG. 9 depicts physicochemical information of the exemplary raw materials: Measured particle size distribution of fillers. (A) Fluorescent pigment. (B) $TiO_2$ rutile powder. (C) Glass microsphere. (D) Chemical structure of the polystyrene-acrylate matrix.

Here $TiO_2$ is selected because of its high spectral reflectance in the visible (0.45-0.7 μm) and near infrared (0.7-2.5 μm) regions (see FIG. 8A). On the other hand, its absorptivity of the sunlight in the region (0.25-0.45 μm) results in an overall solar reflectance of less than 0.9 of a $TiO_2$-based coating, which is not high enough to reduce the direct sunlight heating and realize meaningful SDRC. To address this issue, a highly-efficient and low-cost fluorescent pigment ($SrAl_2O_4$:$Eu^{2+}$,$Dy^{3+}$,$Yb^{3+}$) is added to the polymer matrix as an additional filler to reduce the heat generated by the solar absorption through fluorescent emission. This strategy, as will be shown in the paper, removes the limitation of conventional coating materials in achieving very high solar reflectance. For the broadband emissivity needed for our broadband SSRC design, we purposely choose the above-mentioned three types of fillers with wide ranges of particle sizes (see FIG. 9A-C). For the convenience of discussion, the coating with fluorescent pigment is termed "SSRC coating", while the control coating without fluorescent pigment yet specially designed following the broadband radiator (see its optical properties in the next section) is designated as "white coating".

Figure 3:
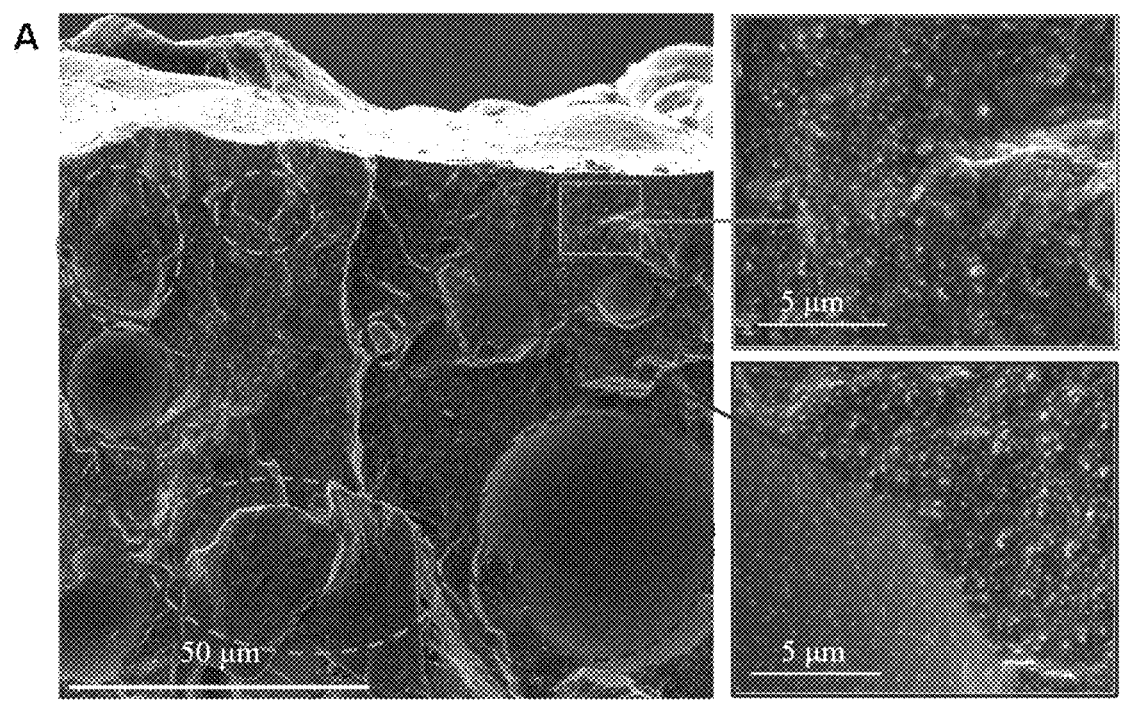
FIG. 3 depicts microstructures and optical properties of FR and white coatings. (A) SEM micrographs of the SSRC coating. The left panel is a cross-sectional view image; the right two panels are enlarged view of a micro-sized fluorescent particle and a hollow glass microsphere. Both images reveal uniform distribution of $TiO_2$ nanoparticles. (B) Infrared emissivity spectra and (C) solar absorptivity spectra of the SSRC coating (under unexcited state) and the white coating, overlaid with the atmospheric transmittance spectrum and the standard solar spectrum, respectively. (D) Absorption, fluorescent excitation and emission spectra of the SSRC coating, overlaid with the standard solar spectrum. (E) Modified ESR for the SSRC coating, the solar reflectance (SR) for the cool white coating and the extracted fluorescence-reduced solar absorption (ESR–SR is equal to the generated fluorescent upflux).
Figure 3:
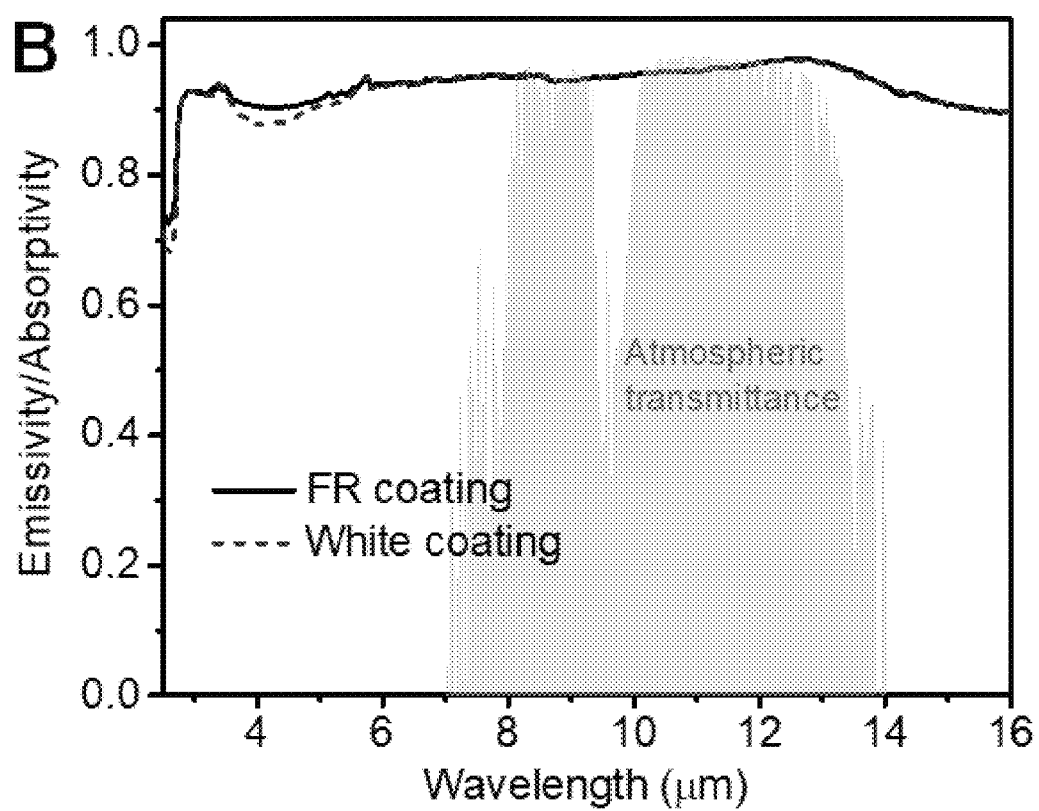
Figure 3:
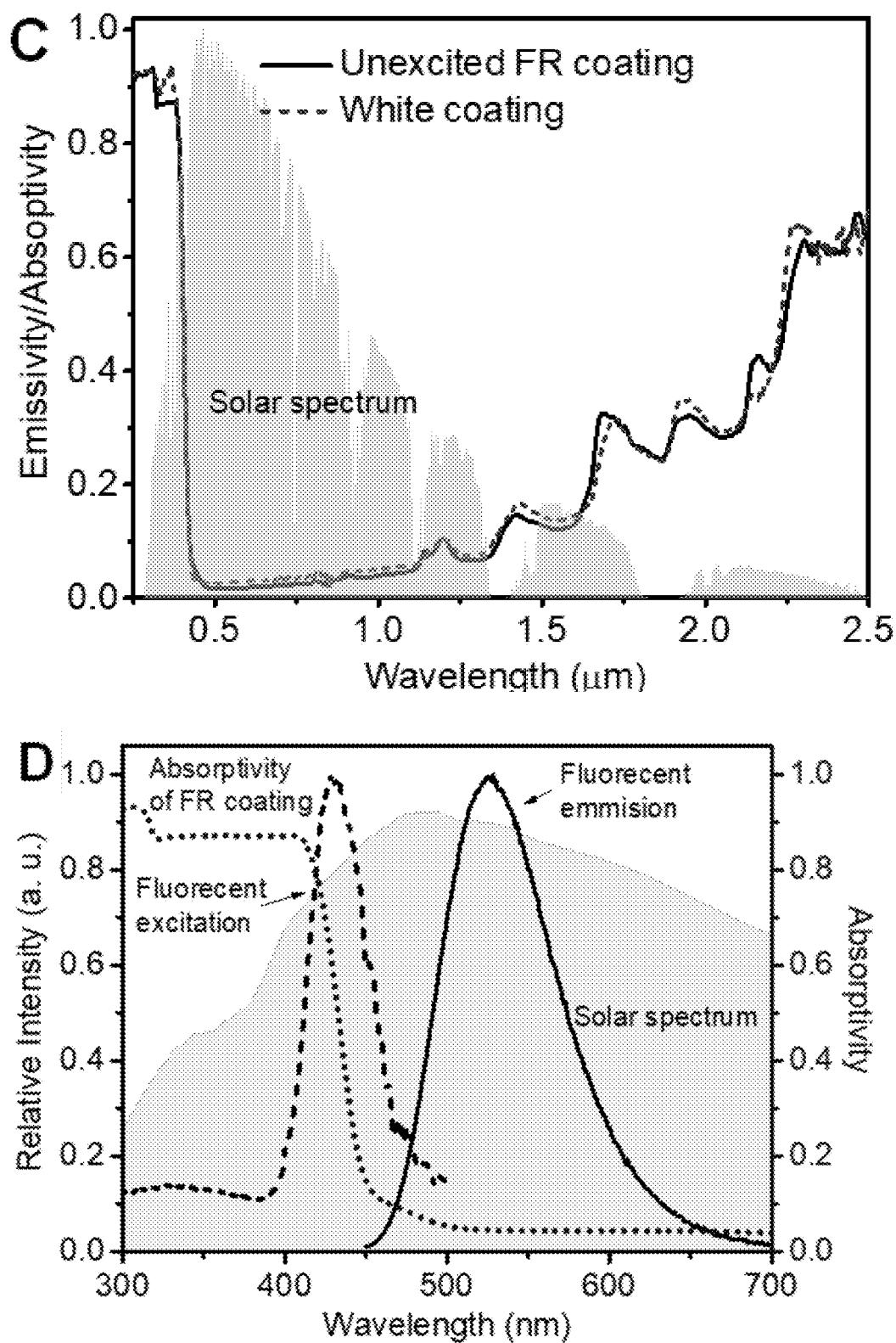
Figure 3:
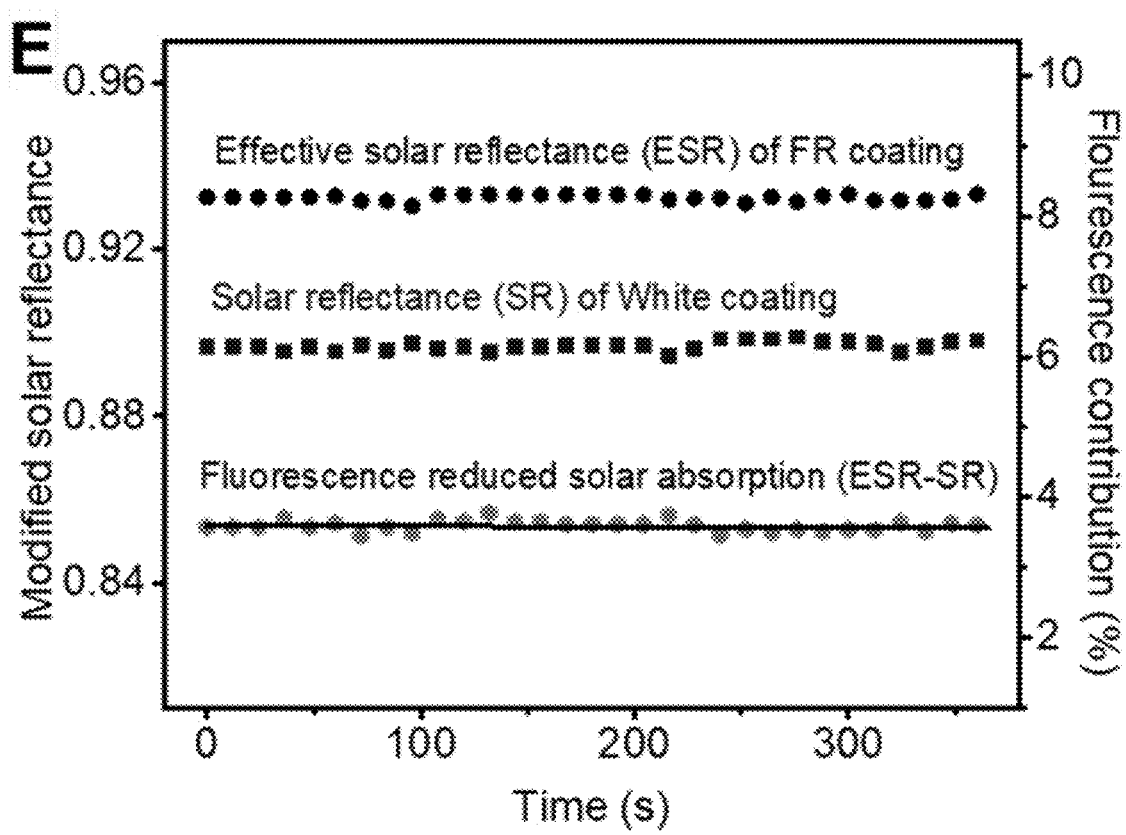

FIG. 3 shows the microstructures and optical properties of the SSRC coating and white coating samples. As observed from the scanning electron microscopy (SEM) micrographs for the formed SSRC coating membrane in FIG. 3A, the micro-sized fluorescent particles are uniformly mixed with the $TiO_2$ nanoparticles and glass microspheres. The emissivity spectra of each component and each combination of two components of the SSRC coating are presented in FIGS. 8B and C, all of which generally exhibit a broadband characteristic owing to multiple scatterings of broad-sized distributed inorganic particles in the polymer matrix. By combining them together, however, the coating with the three fillers advantageously exhibits an enhanced overall emissivity of about 0.90 between 3 to 50 µm and an even higher infrared emissivity of approximately 0.96 between 8 to 13 µm, indicating that strong emissivity exists both within and outside the atmospheric transparency window (FIG. 3B).

Figure 10:
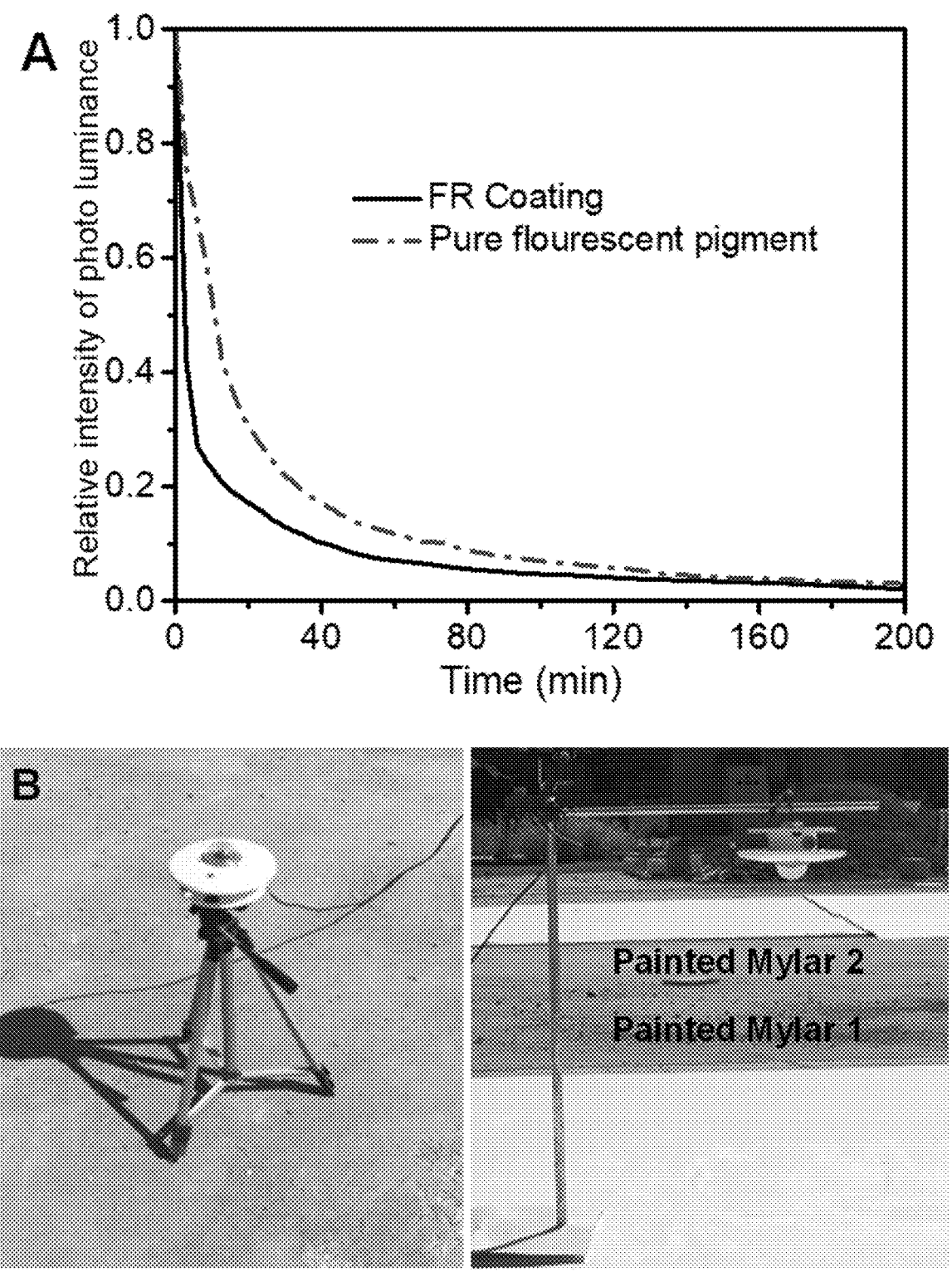
FIG. 10 depicts measurements of fluorescent properties: (A) Photo luminance emission lifetime of the SSRC coating and pure fluorescent pigment used in this research. (B) Field test of fluorescence contribution. Photographs of the upward-facing (left) and downward-facing (right) pyranometers on two identical aluminized Mylar specimens (5.0-m-long×4.0-m-wide×500-μm-thick) individually painted with the SSRC coating and white coating to test the ESR, SR and the fluorescence contributions to the cooling power (ESR–SR).

Now we examine the absorption and fluorescence properties of the SSRC coating thus formed. The solar reflectance of the SSRC coating under the unexcited state and the white coating is 0.898 and 0.895, respectively (see FIG. 3C and Table 1). FIG. 3D shows that the excitation peak of the SSRC coating is around 420 nm, which is below the $TiO_2$ absorption band edge. It is obvious that the white and SSRC coatings should have almost the same solar reflectance under the unexcited state (FIG. 3C). However, when exposed to the direct sunlight, the Purcell-effect-enhanced fluorescence emission of the SSRC coating converts the sunlight around 420 nm to the 525 nm wavelength range (i.e., yellow-green luminescence) (FIG. 10A, FIG. 3D). Hence, the overall solar absorption in Eq. (1) is modified as:

$$P_{sun} = P_{abs} - P_{fluo} \qquad (5)$$

where $P_{abs}$ is the solar absorption of the coating, and $P_{fluo}$ can be expressed as follows:

$$P_{fluo} = \alpha \beta_{emit} \Phi \int E_{fluo}(\lambda) A_{RC}(\lambda) I_{sun}(\lambda) d\lambda \qquad (6)$$

where $I_{sun}$ is the solar spectrum, $E_{fluo}(\lambda)$ is the excitation spectrum of the SSRC coating (black dashed line in FIG. 3D), $A_{RC}(\lambda)$ is the absorptivity spectrum of the SSRC coating (blue dotted line in FIG. 3D), and a is the proportion of $P_{abs}$ for fluorescent excitation, $\beta_{emit}$ is the ratio of fluorescence emission energy (black solid line in FIG. 3D) and excitation energy, $\Phi$ is the fluorescence quantum yield of the SSRC coating.

TABLE 1

Spectral solar reflectance measured for the coatings

| Sample | Solar | UV | VIS | NIR |
|---|---|---|---|---|
| Unexcited SSRC coating | 0.898 | 0.128 | 0.949 | 0.893 |
| White coating | 0.895 | 0.121 | 0.946 | 0.897 |

In experiments, the power of fluorescence emission is integrated as $P_{fluo} = \eta P_{sun}$, in which $\eta = (ESR - SR)$ is measured using the setup shown in FIG. 10B following ASTM E1918-16. The ESR and SR are the measured upward radiative power of the SSRC coating and the white coating, respectively. The Purcell-effect-enhanced fluorescence emission compensates for the shortcoming of $TiO_2$'s high absorption in the region of 0.25-0.45 µm. Consequently, the SSRC coating exhibits an ESR of 93.4% under direct sunlight (FIG. 3E), which corresponds to an ESR-SR of 3.6%, demonstrating the significance of fluorescence emission in the SSRC.

Figure 4:
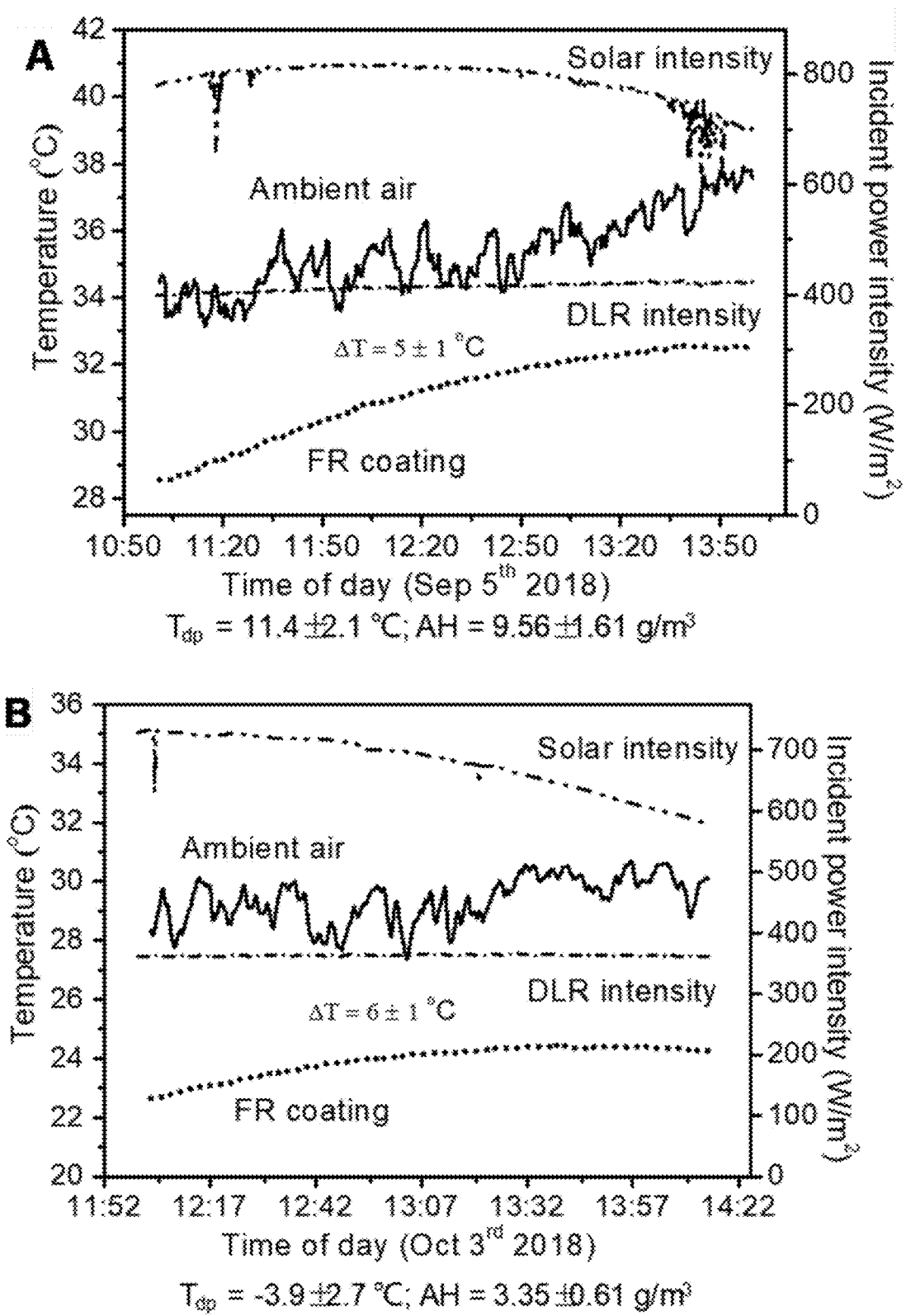
FIG. 4 depicts the cooling performance of SSRC coating over aluminium plate: Measured cooling performance of a painted aluminium plate against the incident solar irradiance and DLR intensity during the noon hours on (A) Sep. 5, 2018, and (B) Oct. 3, 2018 in Beijing. (C) Comparison between cooling temperatures of the SSRC coating at the noontime and night time on Oct. 4, 2018 in Beijing. (D) Measured SSRC coating's temperature against the ambient air temperature, in response to the stepped ascending heat input (heat input power shown at top at the beginning of each time period). When the SSRC coating surface reaches ambient air temperature, the heat input is equal to the net cooling power). *The $T_{dp}$ and AH values labelled beneath the figures refer to the dew-point temperature and the absolute humidity during the testing period.
Figure 4:
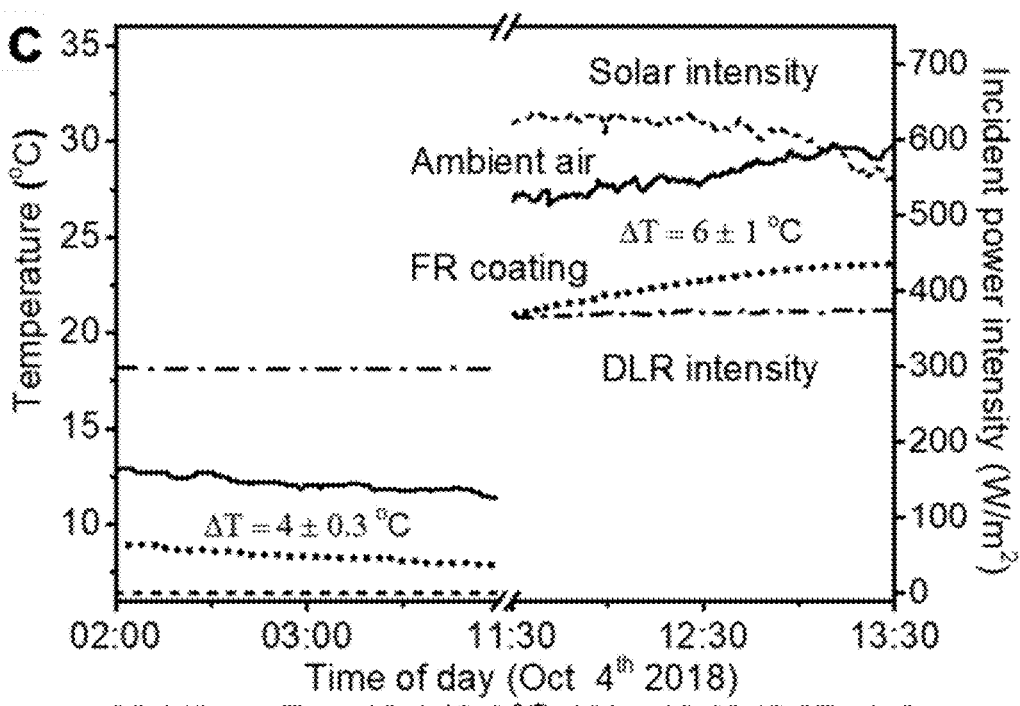
Figure 4:
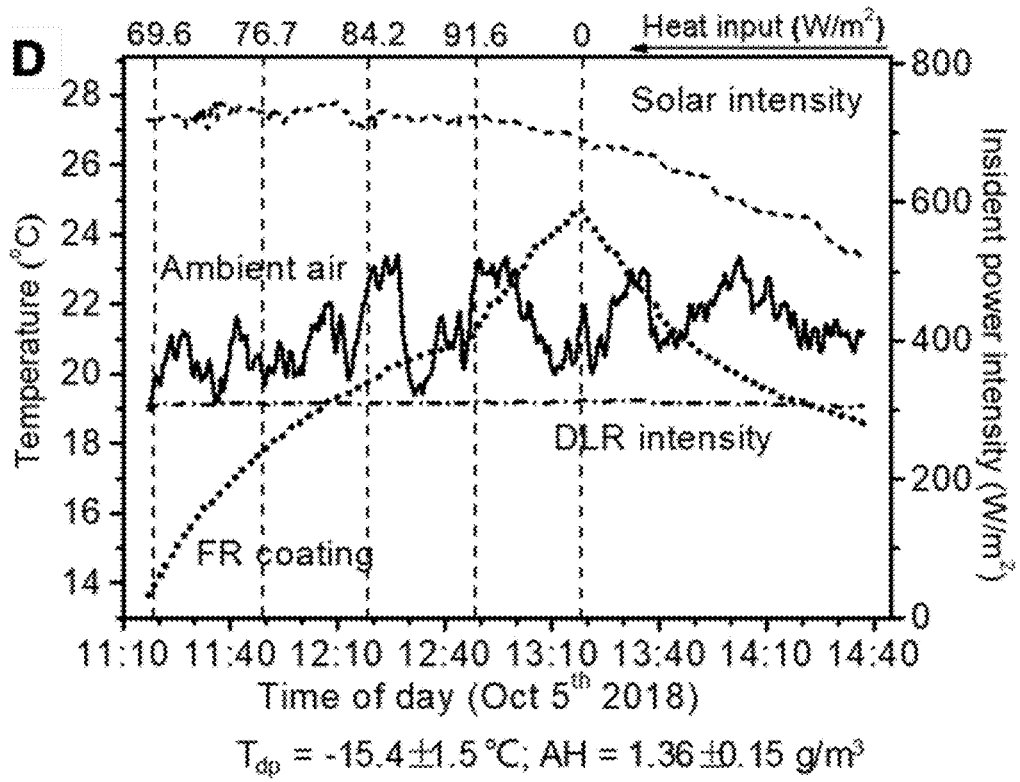
Figure 11:
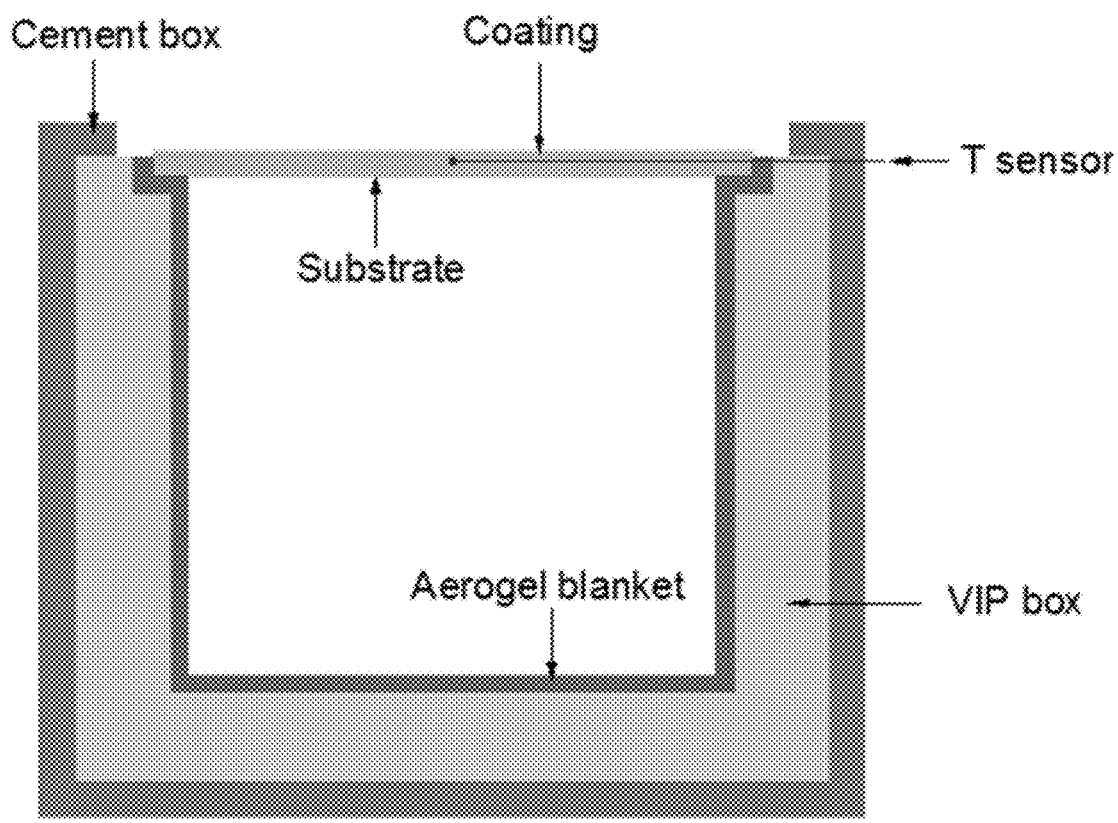
FIG. 11 depicts an exemplary rooftop cooling measurement apparatus: Schematic and photograph of rooftop cooling apparatus.
Figure 11:
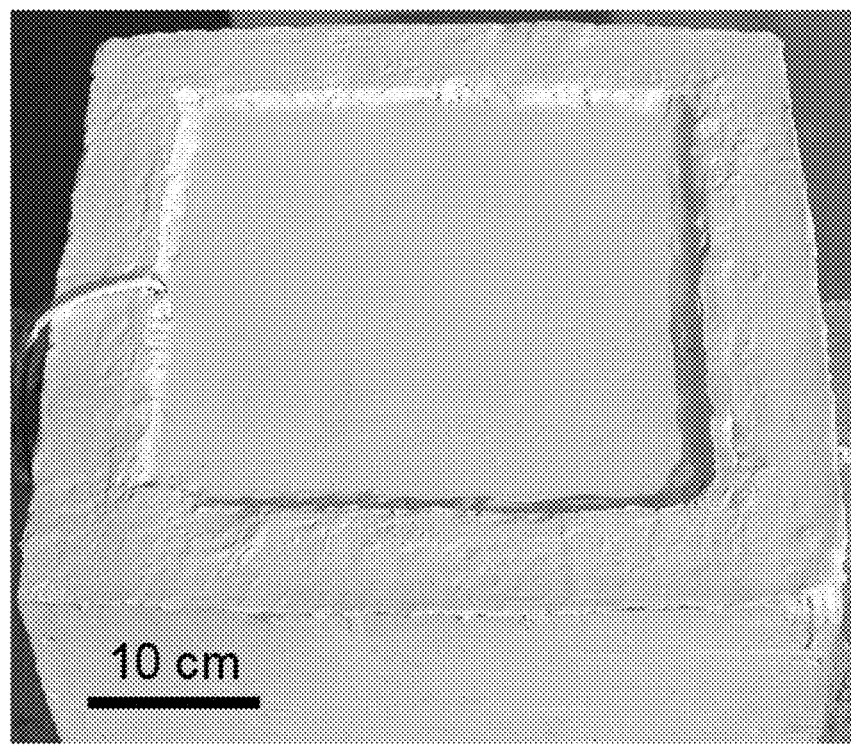

We then evaluate the SSRC capacity of our SSRC coating using a well-insulated apparatus (FIG. 11) in Beijing. On Sep. 5 and Oct. 3, 2018, we measured the cooling effect of the SSRC coating on an aluminum plate, with the results shown in FIGS. 4A and B (weather data shown in FIGS. 12A and B). An obvious sub-ambient cooling effect under direct sunlight is achieved and the respective cooling temperatures are 5±1 and 6±1° C. below the ambient air at the noontime. Such cooling effect is comparable to the best record reported for the existing SDRCs in spite of the lower cost and easier implementation of our SSRC coating. In addition, FIG. 4C verifies that our SSRC coating exhibits an enhanced daytime cooling capability (6±1° C.) yet suppresses night time overcooling (4±0.3° C.) on Oct. 4, 2018, whereas previous SDRC designs usually lead to enhanced night time cooling compared to daytime (weather data shown in FIG. 12C). In building applications, the narrowed diurnal temperature difference can benefit their service life because of the reduced thermal loading and also make our SSRC coating facilitate a more human-comfort temperature. With the measured solar intensity of 744 W/m² and temperature reduction of 6° C. on Oct. 5, 2018 (weather data shown in FIG. 12D), the daytime cooling power of our SSRC coating is measured to be 84.2±8.5 W/m² (FIG. 4D) with a non-radiative heat coefficient of 4.5 $Wm^{-2}K^{-1}$ as determined with the method described in Experimental Procedure. To eliminate the influence of the substrate on the measured cooling power, the net cooling power was theoretically calculated as 64.5 $W/m^{-2}$ according to the recorded environmental parameters during the testing period (the calculation method is shown in the Experimental Procedure).

Figure 5:
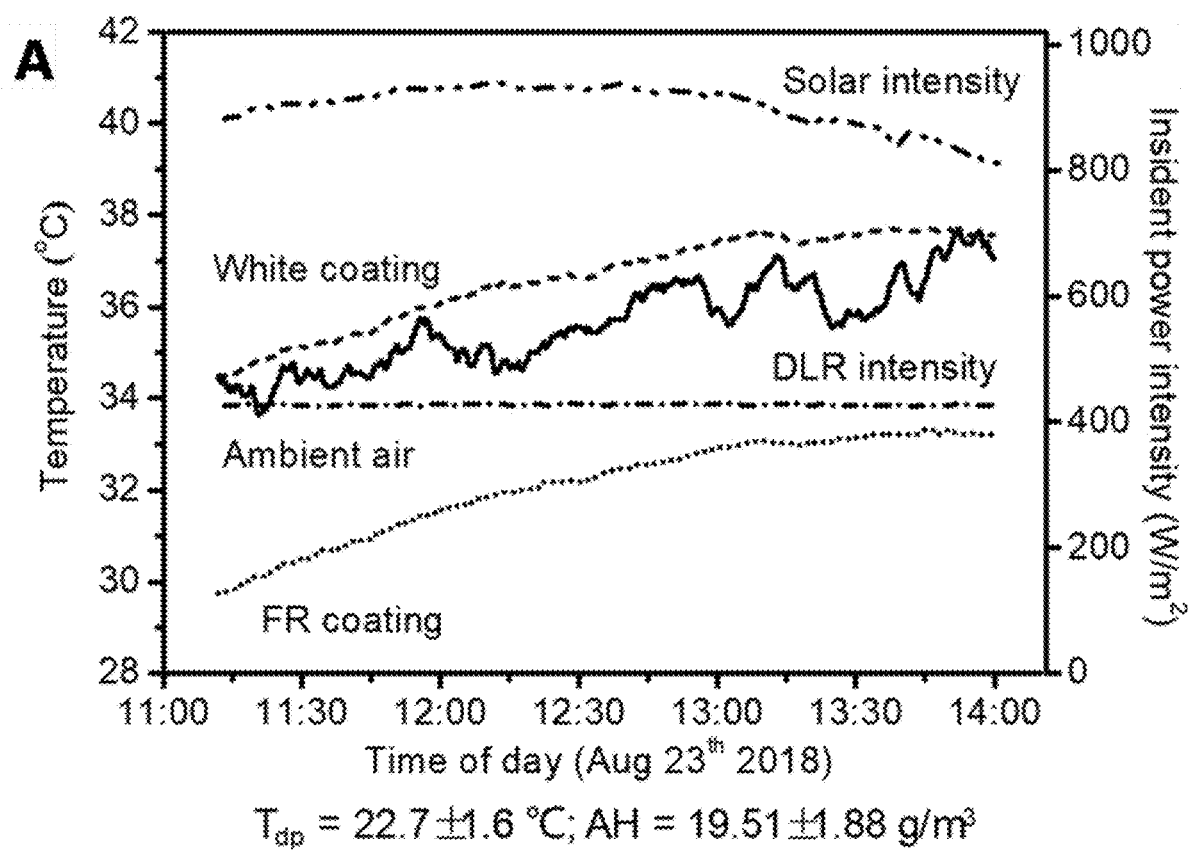
FIG. 5 depicts measured cooling effects of FR and white coatings over aluminium plates. A comparison of the cooling effect between the SSRC coating and the white coating during (A) the midday hours on Aug. 23, 2018 and (B) an entire day on Aug. 27, 2018. The inset is an enlargement of the curves during the midday hours.
Figure 5:
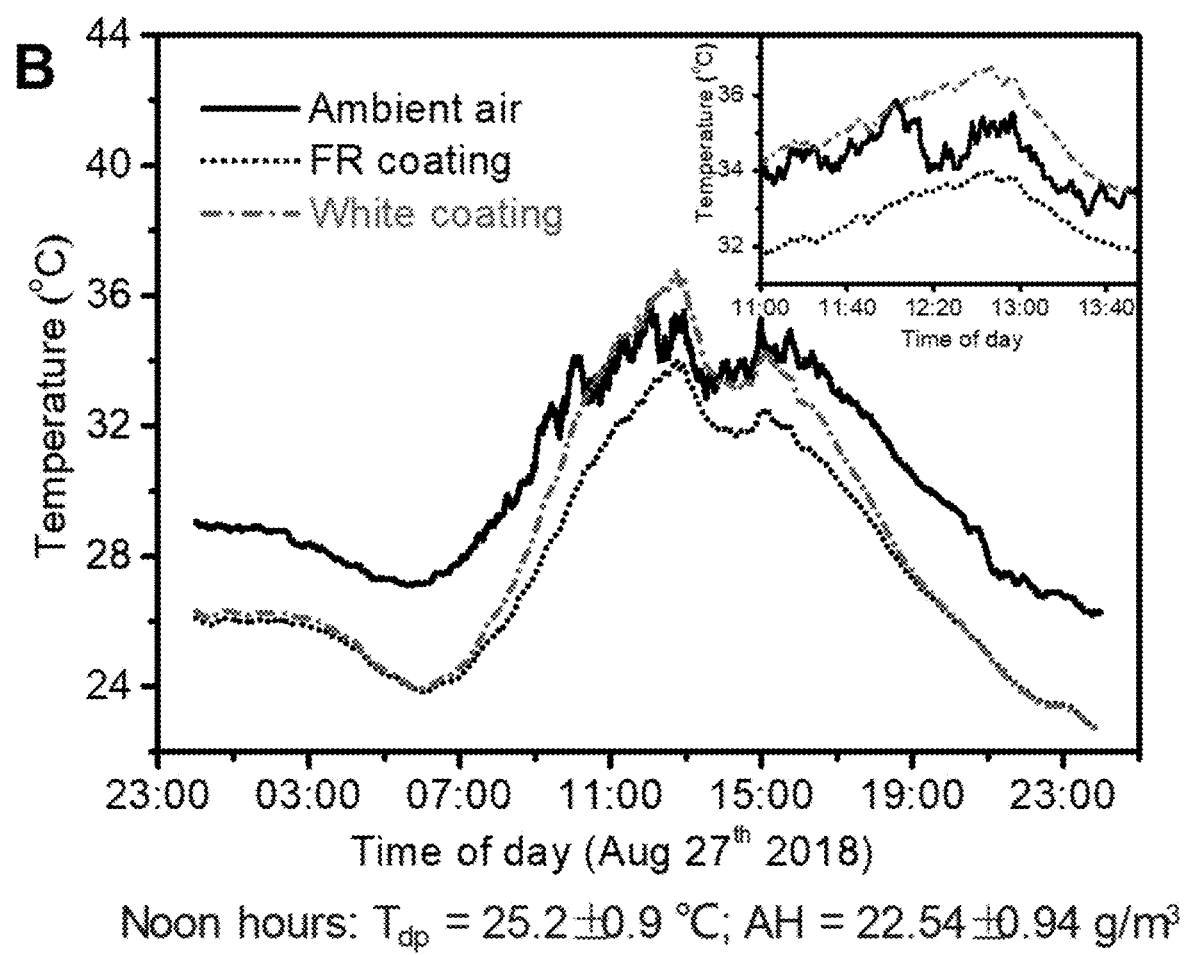

To reveal the fluorescence contribution to SSRC, the FR and white coatings are painted, respectively, on two aluminium plates to perform field tests in August, and the result are shown in FIG. 5A. During the middy hours of Aug. 23, 2018 (weather data shown in FIG. 12E), the average temperature of the FR-coating-painted aluminium plate is approximately 3.3° C. below the ambient air temperature, whereas that coated with the white coating remains slightly above the ambient air temperature. On the one hand, no cooling effect observed for the white coating indicates that the solar absorption by the white coating and its thermal emission to the sky is almost balanced. On the other hand, the significant sub-ambient cooling effect observed for the SSRC coating clearly reveals the net cooling power contributed by the fluorescence-mediated cooling at the noontime. Even on a cloudy, hazy and windy day (Aug. 27, 2018, weather data shown in FIG. 12F), the two devices remain respectively below and above the ambient air temperature under direct sunlight (inset of FIG. 5B). During the night, early morning and late afternoon, their temperatures are nearly superimposed and clearly below the ambient air temperature (FIG. 5B), indicating that fluorescent cooling occurs only when the solar intensity is above a certain threshold value. Nevertheless, both sets of results unambiguously illustrate the profound significance of fluorescent emission in the observed SSRC effect.

Figure 6:
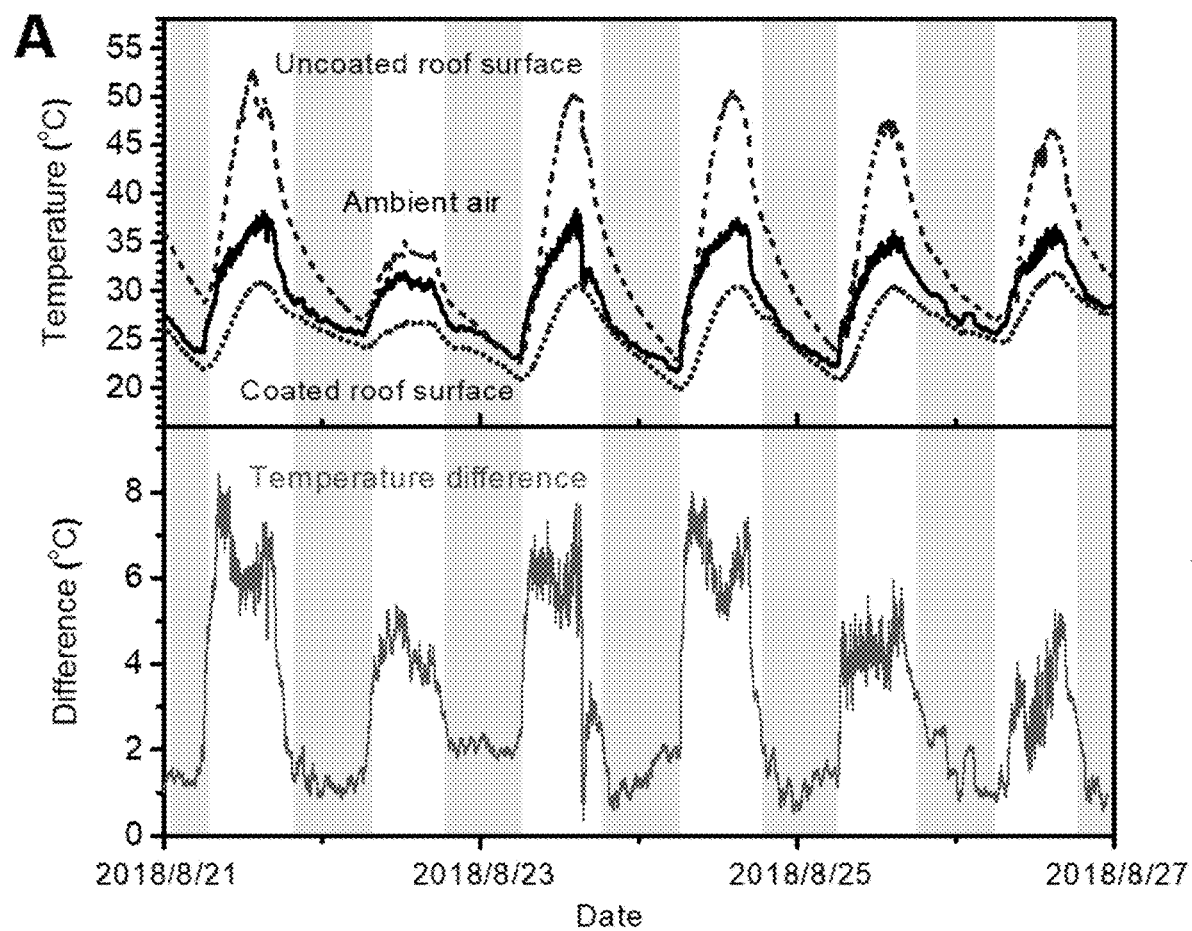
FIG. 6 depicts continuous field tests of the SSRC coating's cooling effect on scale-model buildings: (A) Top panel: Measured sub-ambient cooling effect of the SSRC coating painted on the roof surface of a scale-model building against the ambient air temperature from Aug. 21, 2018 to Aug. 27, 2018; Bottom panel: calculated temperature difference between the ambient air and the coated roof surface. (B) Top panel: comparison of the room interior temperatures between the coated and uncoated scale-model buildings; Bottom panel: calculated temperature difference between the uncoated and the coated roof interior The shadow parts refer to the nighttime regions (6:00 pm-6:00 am) and the unshaded parts refer to the daytime regions (6:00 am-6:00 pm).
Figure 6:
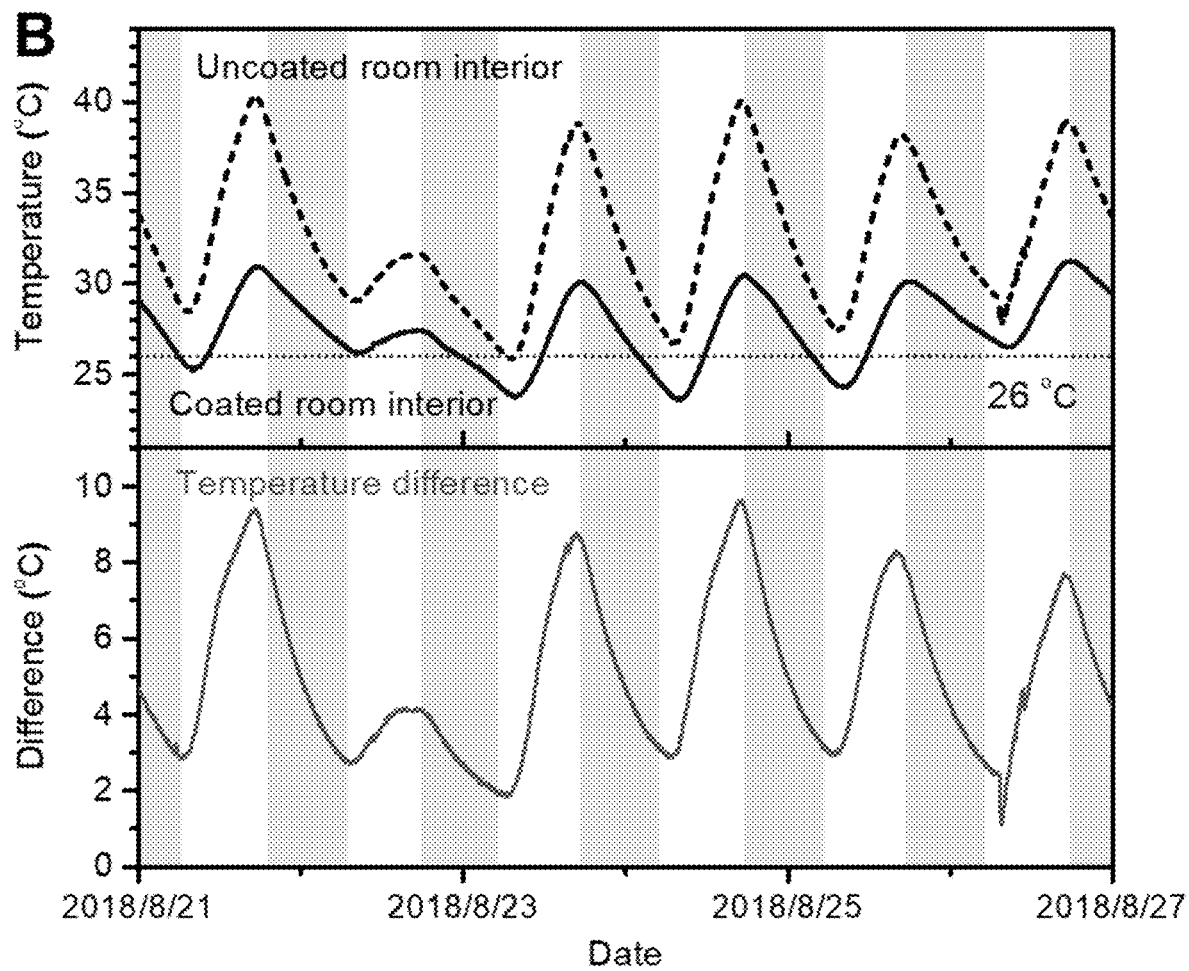
Figure 13:
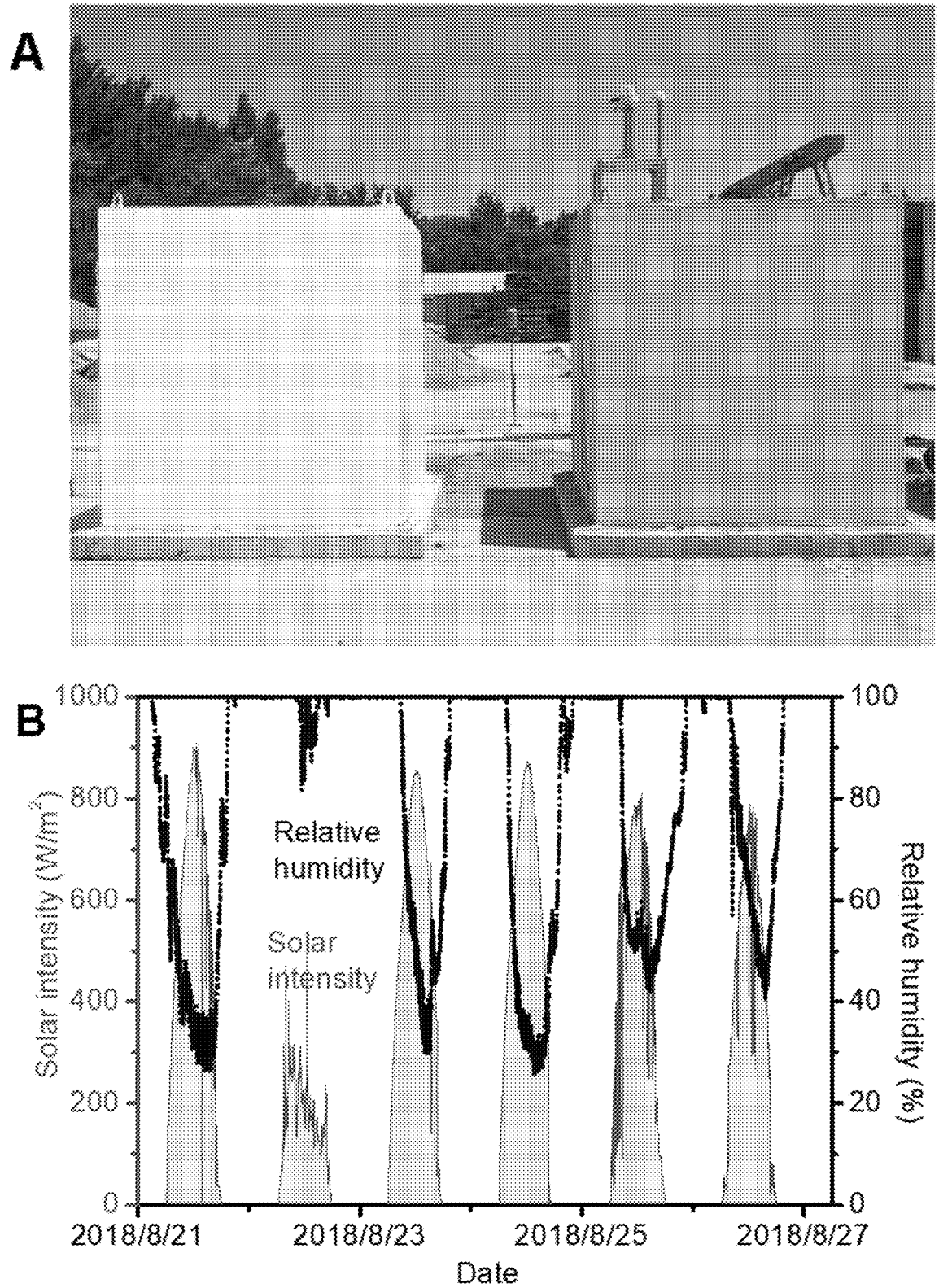
FIG. 13 depicts scale-model building test. (A) Photograph of scale-model buildings: (B) Solar intensity and relative humidity during the testing period in summer. (C) Wind speed during the testing period in summer.
Figure 13:
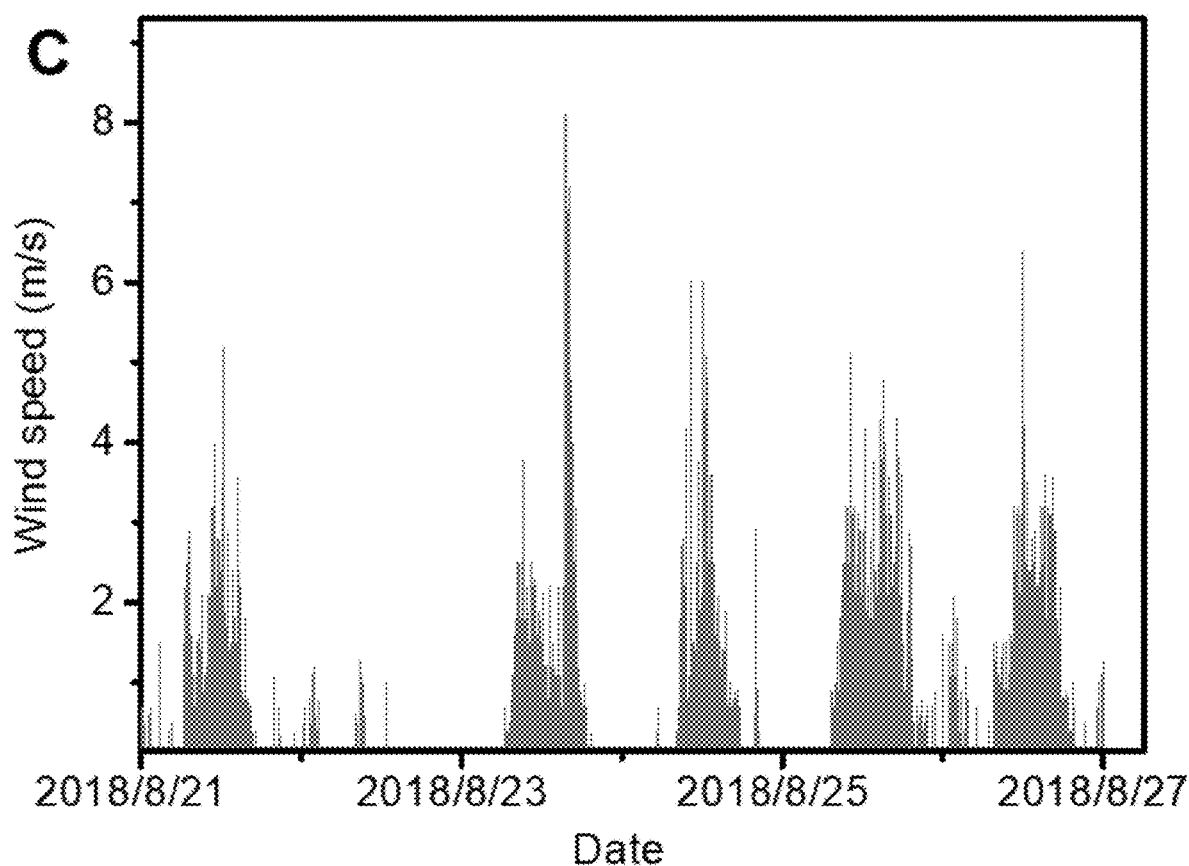

For the first time, we carry out a continuous field test on two scale-model buildings (FIG. 13A) to clearly elucidate the SSRC coating's SSRC ability under real working conditions in summer in Beijing, with the results shown in FIG. 6. Regardless of the weather conditions (FIGS. 13B and C), the surface temperature of the painted roof is always below the ambient air temperature over the test period of one week in August in Beijing, with a maximum sub-ambient temperature reduction of 7° C. at the noontime and 1° C. at the night time (FIG. 6A). Such enlarged sub-ambient daytime cooling yet suppressed night time cooling effects in real buildings are probably ascribed to the bulky dimension and substantial thermal mass of the concrete substrate. As a result, the diurnal temperature difference of the painted roof surface is even smaller than that of the ambient air (11° C. versus 16° C.). Nevertheless, the coated building's interior temperature is successfully maintained around the human thermal comfort temperature (26° C.), with a sub-ambient temperature reduction temperature reduction ranging from 2° C. to 10° C. during the test period (maximum sub-ambient temperature reduction of 9° C. at noontime, FIG. 6B).

One important metric that affects the SSRC coating's SSRC effect is the coating's solar reflectance, which may attenuate over time mainly due to ageing, weathering, and particulate accumulation when exposed to outdoor environments. To address this issue, the coating's weather resistance, chemical tolerance and self-cleaning properties are systematically evaluated. After 960 h of artificial accelerated weathering tests, the attenuation ratio of the coating's solar reflectance under the unexcited state is 3.7%. The excellent weather resistance (FIG. 14A and Table 2), chemical tolerance (FIG. 14B), and the hydrophobic (FIG. 14 C-D) self-cleaning properties jointly enable the SSRC coating to maintain its high solar reflectivity for a long period, thus ensuring the sustainability of its SSRC effect. Such outstanding long-term durability and environmental applicability of the SSRC coating not only expands its application scenarios and service lifetimes but also minimizes the maintenance cost of painted building surfaces.

TABLE 2

Measured spectral solar reflectance of the SSRC coating before and after treatment. Spectral and solar reflectance measured for the SSRC coating in the ground state before artificial accelerated weathering, and after weathering for 480 and 960 h, as well as after 480 h of salt spray tests, respectively.

| Samples | Unexcited SSRC coating | | | |
| --- | --- | --- | --- | --- |
|  | Solar | UV | VIS | NIR |
| Before weathering | 0.898 | 0.128 | 0.949 | 0.893 |
| After weathering for 960 h | 0.861 | 0.155 | 0.892 | 0.874 |

The core design of this research is to develop a highly scalable cooling coating material towards the real-world applications of SDRC technologies, especially for large-scale building cooling. The experimental results presented above have clearly demonstrated that a variety of commonly used materials can be employed to fabricate a building coating with a significant SSRC effect. Instead of excessively pursuing the properties of raw materials or relying on sophisticated structural designs, we can also achieve effective cooling performances through simple compensation methods. The designed SSRC coating is not only cost-effective, environmentally friendly and convenient to use in construction, but also shows excellent durability and an outstanding self-cleaning capability. These characteristics remove the practical barriers to the application of current SDRC technologies for large-scale building cooling in real-world conditions.

In conclusion, we have successfully engineered a building coating material with sub-ambient radiative cooling through the combined effects of sunlight-induced fluorescence, particle scattering and materials' broadband emissivity. The proposed broadband radiator makes use of the sky as a temperature regulator to narrow the diurnal temperature difference of our SSRC coating, and also significantly broadens the scope of materials selection. Such generic design concept presented here can also be applied to other surface materials when cooling is in need under the sunlight. The approach presented here is cost-effective and hence opens up a totally new avenue in translating the SDRC technology into broad and practical applications in building environments, reducing the energy demand of building cooling while achieving human thermal comfort, improving human health and productivity.

Experimental: Material Selection

To fabricate the coating with fluorescent pigment (SSRC coating), a styrene-acrylate emulsion, grade EC0702, was purchased from BASF Corporation in Beijing, China and was used as the matrix (i.e., a water-based binder) of the coating. The functional pigments and fillers were selected as follows: a pigment ($SrAl_2O_4:Eu^{2+},Dy^{3+},Yb^{3+}$) with yellow-green luminescence, its fluorescence quantum yield is about 68.24% (purchased from Shenzhen Yao De Sheng Technology Co., Ltd., Shenzhen, China), titanium dioxide rutile (grade Ti-Pure R-902, purchased from DuPont Chemicals Co., Ltd., Beijing, China), and hollow glass microspheres (purchased from Sino Steel Maanshan Institute of Mining Research Co., Ltd., Maanshan, China). The addition of inorganic fillers significantly enhances the infrared emissivity of the polymer matrix below 5 μm and results in a broadband emitter with an overall infrared emissivity over 0.9.

Additionally, appropriate paint additives, including a wetting agent, a dispersant agent, an antifoaming agent, a suspending agent, a levelling agent, and a coalescent agent were selected to improve the quality and performance of the coating. All materials were used as received.

The optimized SSRC coating was composed of poly-styrene-butylacrylate emulsion (40.0 wt. %), luminous pigment (15.0 wt. %), titanium dioxide rutile (28.0 wt. %), hollow glass microspheres (6.0 wt. %), water (6.0 wt. %), wetting agent (0.2 wt. %), dispersant (0.3 wt. %), antifoaming agent (0.8 wt. %), suspending agent (2.5 wt. %), levelling agent (0.5 wt. %), and coalescent agent (0.7 wt. %). The yellow-green luminous pigment doped with 1.2 wt. % $Yb^{3+}$ was selected as fluorescent pigment. To quantify the contribution of fluorescence in the cooling effect, a coating without fluorescent pigment (white coating) was also fabricated. The white coating has the same material components as the SSRC coating except the fluorescent pigment.

Experimental Procedure: Preparation of FR and White Coatings

The preparation of the SSRC coating proceeded as follows: The poly-styrene-acrylic emulsion, luminous pigment, titanium dioxide rutile, and an appropriate amount of water were first added into a mixing setup, followed by the addition of the wetting agent, dispersant, antifoaming agent, and suspending agent. The mixture was stirred at high speed (600 r/min) for 60 min. At this stage, the glass microspheres, antifoaming agent, and coalescent agent were added; the mixture was continuously mixed at a low speed for 20 min to fabricate the SSRC coating. The fabrication procedure of the white coating was identical to that of the SSRC coating. The coatings were painted onto different substrates for subsequent measurements.

Experimental Procedure: Characterization of Optical Properties

Following the ASTM E903-12 standard test method, a UV/VIS/NIR spectrophotometer (Lambda 750) equipped with an integrating sphere (150 mm diameter, Labsphere RSA-PE-19) was employed to measure the spectral reflectance of the white coating. Because the spectrophotometer's calibration protocol is based on the assumption that the wavelength of detected light is identical with that of incident light, it is inappropriate to directly measure the spectral reflectance of the SSRC coating under excited state (i.e., apparent effective spectral reflectance) using the UV-VIS-NIR spectrophotometer. Therefore, the spectral reflectance of the SSRC coating was measured under unexcited state after keeping the sample in a dark environment for a sufficiently long period to allow the fluorescent pigment to decay to its unexcited state. The solar reflectance was calculated by integrating the measured spectral signal weighted with air-mass-1.5 beam-normal solar spectral irradiance.

A Fourier-transform infrared spectrometer (FTIR, PerkinElmer Frontier FT-MIR/NIR) equipped with an integrating sphere was employed to characterize the infrared spectral response of the coating samples. A fluorescence spectrophotometer (NanoLog Infrared Fluorescence Spectrometer, Horiba Jobin Yvon) was used to measure the luminescence excitation and emission spectra of the SSRC coating sample at room temperature.

Experimental Procedure: Characterization of Overall Thermal Emittance

Following the ASTM C1371 standard test method for determining the emittance of materials near room temperature, a portable differential thermopile emissometer AE1 (Devices & Services Co., Dallas, TX) was used to measure the overall thermal emittances of the coatings.

Experimental Procedure: Experimental Observation of the Purcell Effect

Time-resolved fluorescence signals of the SSRC coating and a pristine fluorescent pigment sample were measured as follows: (1) both samples were excited by the sunlight; (2) the two samples were then placed in a dark environment to individually measure their fluorescence signals every 30 min for 4 h; and (3) the two sets of results were normalized by their respective maximum signal intensity. FIG. 11A clearly shows that the total decay rate of the SSRC coating is much faster than that of the pristine fluorescent pigment, demonstrating the Purcell enhancement effect.

Experimental Procedure: Determination of Fluorescence Contribution

Following ASTM E1918-16, the effective solar reflectance (ESR) of the SSRC coating was measured using a large aluminized Mylar (5.0 m long, 4.0 m wide, 500 μm thick) coated with the SSRC coating, and the sample was directly placed on the concrete ground. Here ESR is defined as the ratio of the sum of the reflected solar irradiance and the fluorescence-emitted upflux to the solar intensity (21). The solar reflectance (SR) of the white coating (i.e., reference sample) painted on an identical aluminized Mylar was also measured. Two potable pyranometers (JTR05, Beijing JT Technology Co. Ltd) with a resolution of 1 W/m² were used to measure the above-mentioned ESR and SR. The diameter of the sensor is 3.0 cm. The analogue output from the pyranometer was digitized with a readout meter that can be directly connected to a desktop.

The test was conducted on a clear sunny autumn day. One upward-facing pyranometer was used to measure the incident solar irradiance (I); concurrently, a downward-facing pyranometer was positioned at the centre of each painted aluminized Mylar to measure the reflected solar irradiance ($I_r$) and the effectively reflected solar irradiance ($I_{er}$), which was the sum of the reflected solar irradiance and the fluorescence upflux. According to ASTM E1918-16, the solar reflectance of the conventional white coating (SR) and the effective solar reflectance of the SSRC coating (ESR) can be calculated using the following equations:

$$SR = \frac{I_r}{I_e} \quad (7.1)$$

$$ESR = \frac{I_{er}}{I_i} \quad (7.2)$$

For the measurement of these two metrics, the surface area of the samples should be infinite in theory. Therefore, when a downward-facing pyranometer is used, the sensor-to-surface view factor ($F_{12}$) needs to be considered to correct the measured solar reflectance and effective solar reflectance, which otherwise would be underestimated. Here, $F_{12}$ is the fraction of radiation leaving surface 1 that is intercepted by surface 2. Firstly, the view factor $F_{12}$ of our system was determined following standard field tests. Subsequently, it was used to correct the measured solar reflectance of the white coating (SR) and the effective solar reflectance (ESR) of the SSRC coating. Finally, the true fluorescence contribution (ESR−SR) can be obtained.

Note that the solar reflectance measured using a spectrophotometer is generally higher than that tested in the field under a clear sky illuminated by one sun at solar zenith by as much as 0.08, because the former one is the direct-normal solar reflectance and the latter one is the diffuse solar reflectance. On the other hand, the apparent effective solar reflectance (ESR) of a fluorescent material assessed by the spectrophotometer is much lower than the true ESR evaluated using the method presented above. Therefore, the true effective direct-normal solar reflectance of the SSRC coating is equal to the sum of the measured direct-normal solar reflectance of the SSRC coating in the unexcited state and the fluorescent contribution ESR−SR and it is employed in the theoretical calculations in this work. Actually, the modified effective direct-normal solar reflectance value of 0.934 is higher than the value of 0.854 that tested in the field test by exactly 0.08, which agrees excellently with the literature value.

Experimental Procedure: Characterization of the Transient Radiative Power

An accurate pyranometer (EKO MS-802) and a data logger were used to measure the incident direct and diffuse solar irradiance. The wavelength range, irradiance range and the directional response (at 1000 W/m²) of the pyranometer are 285-3000 nm, 0-2000 Wm⁻², and ±10 Wm⁻², respectively.

An accurate pyrgeometer (EKO MS-202) and a data logger were employed to measure the transient downwelling infrared. The wavelength range and the directional response (at 1000 Wm⁻²) of the pyrgeometer are 4-50 μm and ±10 Wm⁻², respectively.

The upward-facing pyranometer and pyrgeometer were fixed together on a scale-model building's rooftop. The collected data were periodically downloaded and transferred to a desktop computer.

Experimental Procedure: Cooling Performance Tests

To investigate the sub-ambient cooling performance of the FR and white coatings, on-site measurements were carried out on self-designed cooling apparatuses for various painted substrates and scale-model buildings in August, September and October 2018, in Beijing, China.

Description of the Cooling Apparatus

Figure 12:
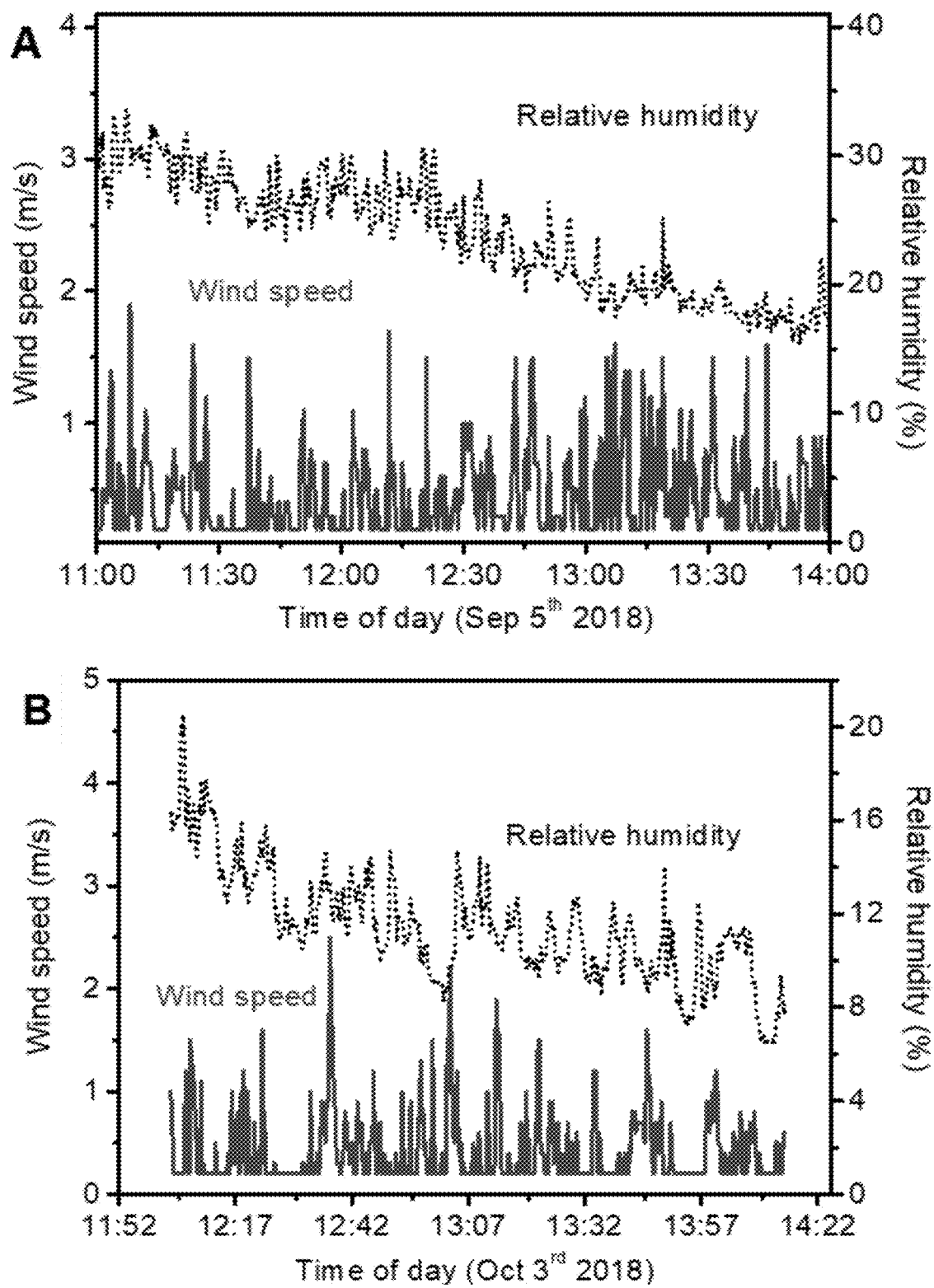
FIG. 12 depicts weather data for the cooling effect measurements over an aluminium plate: (A) Wind speed and relative humidity during the testing period for painted aluminium plate on Sep. 5, 2018. (B) Wind speed and relative humidity during the testing period of painted aluminium plate on Oct. 3, 2018. (C) Wind speed and relative humidity on Oct. 4, 2018. (D) Wind speed and relative humidity during the period of the cooling power measurement on Oct. 5, 2018. (E) Wind speed and relative humidity during the testing period on Aug. 23, 2018. (F) Solar intensity, downwelling infrared intensity and relative humidity on Aug. 27, 2018.
Figure 12:
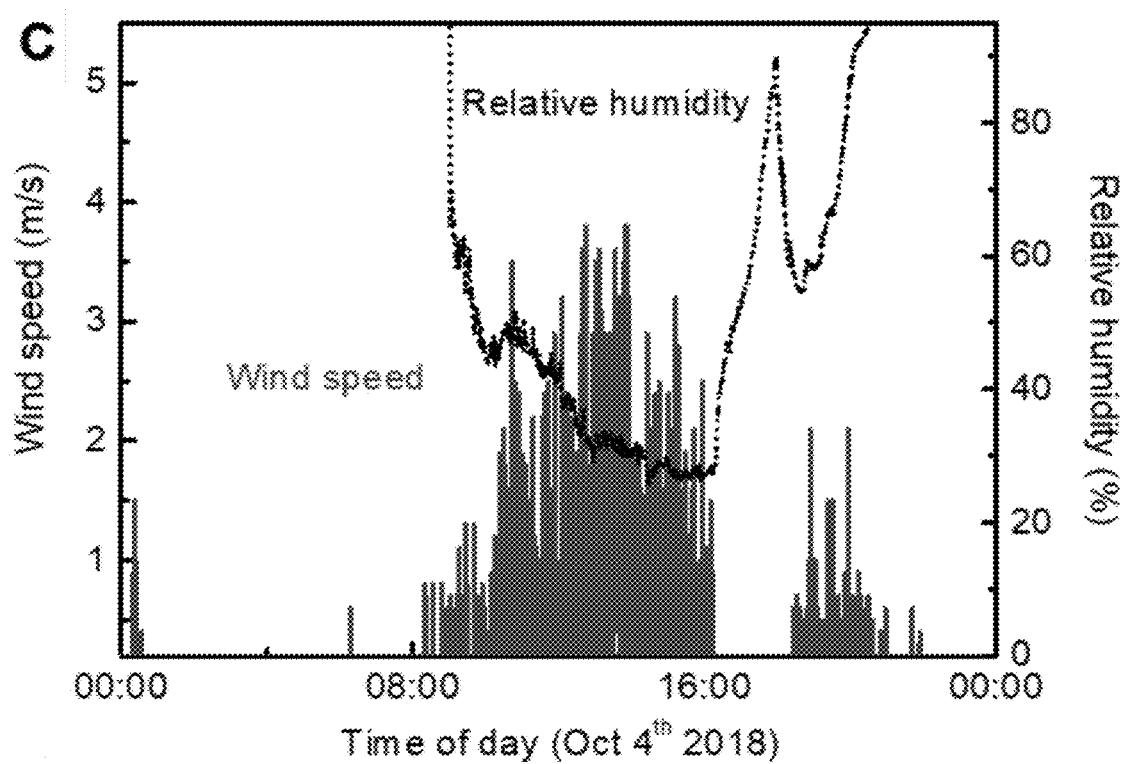
Figure 12:
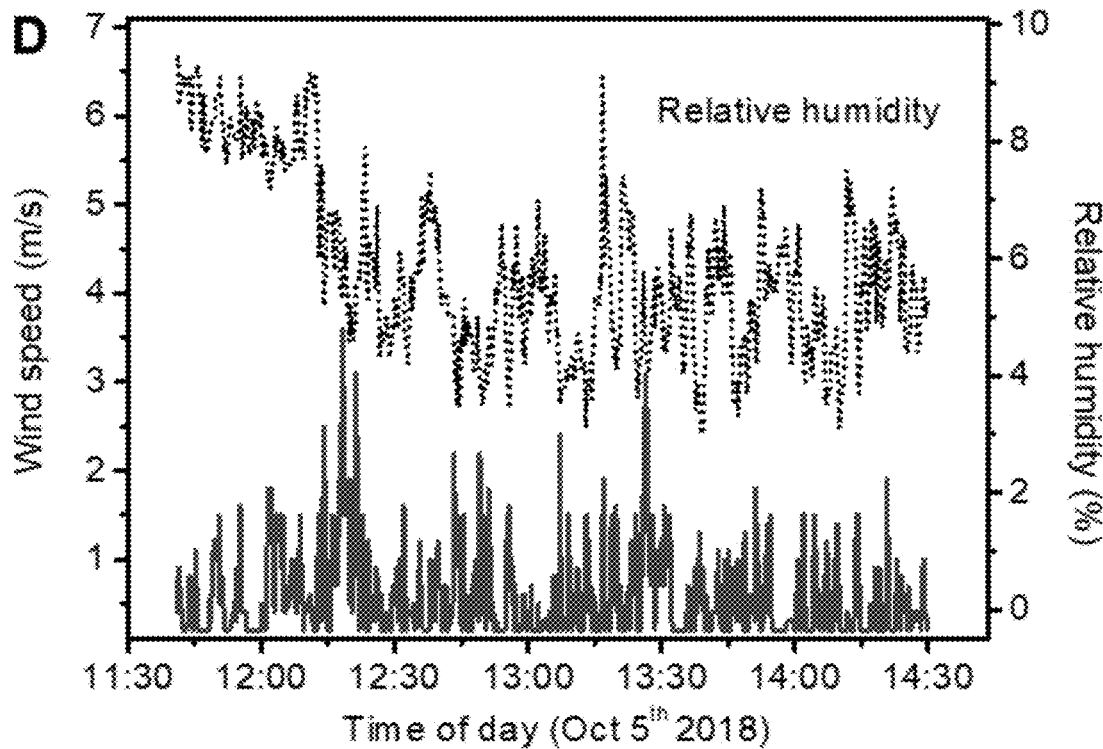
Figure 12:
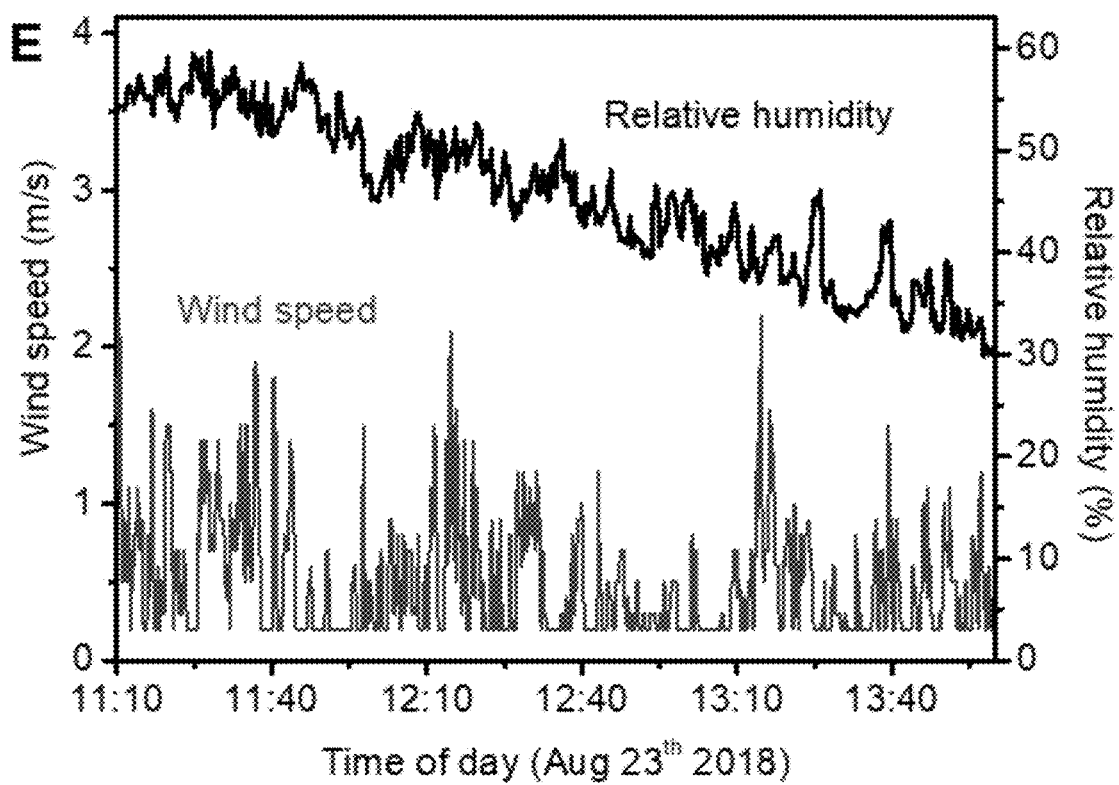
Figure 12:
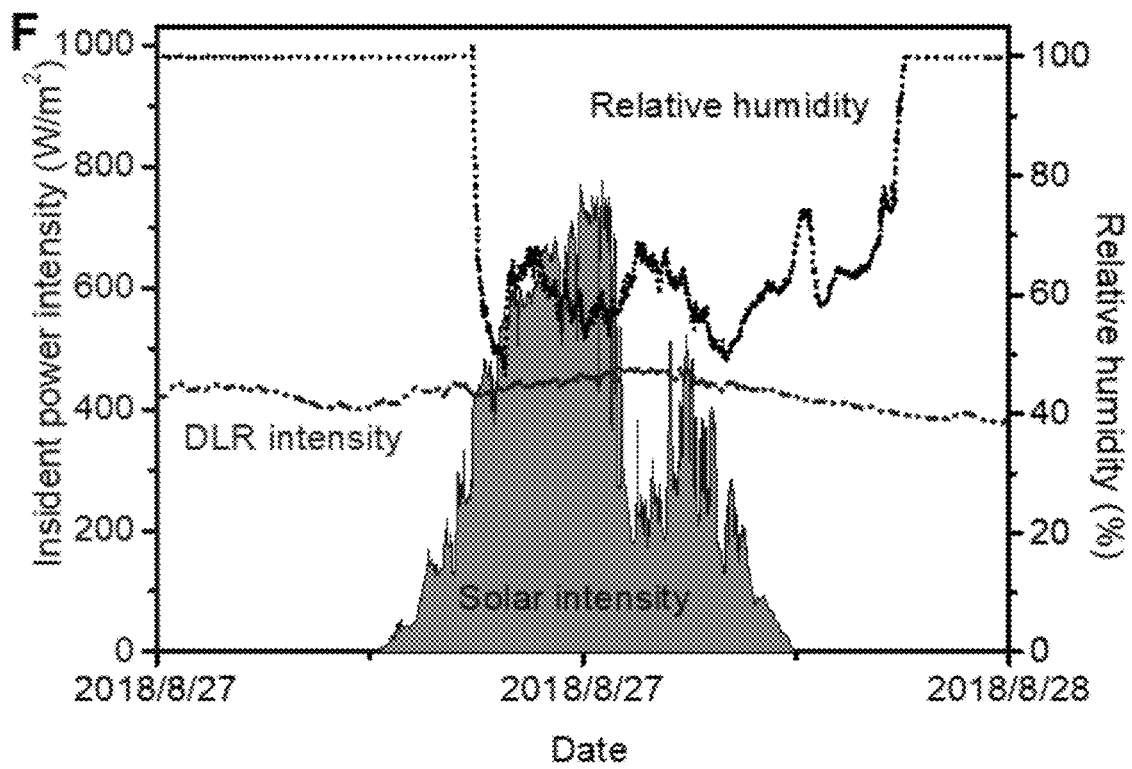

As shown in FIG. 12A, each apparatus consisted of a vacuum insulation panel (VIP) box (inner dimensions: 31.6 cm long, 31.6 cm wide, 29.0 cm high), which was enclosed by 5 pieces of extruded polystyrene panels with an opening on the top. The wall of the VIP box was 4.5 cm thick and had a layer of aerogel blanket (1 cm thick) as the interior liner and a layer of cement paste (2 cm thick) as the exterior cover. The cementitious exterior cover was 2.5 cm higher than the VIP box along the perimeter to provide a wind shield. A substrate plate (i.e., a 1.0 cm thick, 31.0 cm long and 31.0 cm wide aluminium plate) was then placed on the top of the VIP box and its boundary space with the exterior cement cover and the underneath VIP was filled using the abovementioned aerogel blanket. The diameters of the bottom and top circles of the cavity were 28.5 and 30.1 cm, respectively. The distance between these two concentric circles was 780 μm. Finally, the SSRC coating was sprayed on the surface of the substrate as well as the entire apparatus envelope. The dry coating thickness was measured to be approximately 300 μm. The thermal conductivity of the VIP (Fujian Super Tech Advanced Material Co., Ltd., Fuzhou, China) and the aerogel blanket (Zhejiang Nanotech Co., Ltd., Hangzhou, China) is approximately 0.0015 Wm$^{-1}$K$^{-1}$ and 0.02 Wm$^{-1}$K$^{-1}$, respectively, according to the manufacturer data.

Description of the Scale-Model Building

Field tests were also performed using two un-insulated scale-model single-storey buildings on temporary concrete footings and located at the Pilot Test Base of the Technical Centre, China State Construction Engineering Co., Ltd., Beijing (FIG. 7A). Each model building is a 2.0 m long, 2.0 m wide and 2.2 m high pre-fabricated concrete structure with one access door. The walls and roofs of the buildings are made of a 12.5 and 15 cm thick concrete layer, respectively. The model building have one window in the door. To provide the roofs with full southern solar exposure free from shading by surrounding structures and neighbouring scale models, the side-by-side model buildings were oriented to align the ridges of their roofs along a south-north line. The 1.8 m high and 1.9 m wide door of each building faced north.

The FR cool coating was applied onto the roof and external walls of one building and the dry coating's thickness was 300 μm.

Instrumentation

Negative temperature coefficient (NTC) metal-clad thermistors with 0.6 mm diameter and ±0.1° C. accuracy are connected to an analogue-to-digital converter (A/D converter, 20 Bits) to measure the surface temperatures of the painted silicon wafer, copper and aluminium plates, the roofs of the scale-model buildings and the aluminized Mylar. For the copper and aluminium plates, the thermistors were inserted into the holes of 0.61 cm diameter in the middle of one surface of the plates. For the painted silicon wafer, the thermistor was mounted between the centre of the wafer back surface and a 1.0 cm thick aerogel blanket. For the roof surface, the thermistor was embedded into the centre of the roof, thus keeping the sensor surface and the roof surface at the same level. The upper surface of the roof temperature sensor was painted with the FR cool coating.

An NTC thermistor with ±0.1° C. accuracy were installed in a sun-shielded area next to the cooling apparatuses to measure the ambient air temperature. A hygrometer was installed in a thermometer screen to measure the relative humidity, and an anemometer was fixed on an on-site weather tower attached to the side of a model building, with its top 1.0 m above the peak of the roof, to monitor the wind speed.

Data Acquisition Systems

Four multichannel data loggers (Ztic RM 400 series, Beijing Zhongtai Yanchuang Science and Technology Co., Ltd.) with 16 analogue input channels for each logger were used for the data acquisition. All sensors were scanned every 10 s to obtain a data point. The collected data were periodically downloaded and transferred via modem to a desktop computer.

Measurement of the Non-Radiative Heat Coefficient of the Cooling Apparatus

When the cooling apparatus is shielded with an aluminized Mylar sheet to block its access to the sky, the radiative heat exchange is minimized because of the high solar reflectance and infrared reflectance of aluminium, and the coating surface with area A reaches the stagnation temperature $T_0$. At this temperature, $P_{out}A=P_{cond+conv}A=-h_c(T_s-T_{amb})A$. Therefore, the well-known lumped parameter model can be employed to evaluate the $h_c$. The solution of this model can be expressed as follows:

$$\ln\frac{T_s - T_{amb}}{T_0 - T_{amb}} = -\frac{Ah_c}{\rho cV}t \qquad (8)$$

where $\rho$, c and V are the density, specific heat capacity and the volume of the cooler, respectively.

For the painted aluminium substrate, $\rho=2700$ kg/m$^3$, c=880 Jkg$^{-1}$K$^{-1}$ and V=0.01 m. As a result, the equation 8 can be re-written as follows:

$$2.4 \times 10^4 \times \ln\frac{T_s - T_{amb}}{T_0 - T_{amb}} = -h_c t \qquad (9)$$

The non-radiative heat coefficient of the cooling apparatus, $h_c$, can therefore be obtained by heating the aluminium substrate plate, recording its transient temperature and fitting the curve of the time dependence of the transient temperature.

Characterization of the Cooling Power

A square polyimide resistive heater (30.0-cm-long×30.0-cm-wide) with an electrical resistance of 2.3 Ω was adhered to the bottom side of the aluminium plate to heat the cooler and measure the cooling power corresponding to the observed temperature depression. A direct-current digital power source was employed to deliver the stepped ascending heat input by adjusting the input voltages (U). Therefore, the heating power $P_h$ could be obtained by the following equation:

$$P_h = \frac{U^2}{RA} \qquad (10)$$

where A is the area of the aluminium plate. The resistance tolerance of the polyimide resistive heater and the readout accuracy of the power source were ±10% and ±1.0%, respectively, yielding an experimental uncertainty of ±10.1% in the measured cooling power, as computed using the method of square root of the sum of the squares.

Note that the silicon wafer cooler may not be suitable for measuring the cooling power because the acrylic supporter has a thermal conductivity of 0.20 $Wm^{-1}K^{-1}$, which might result in an overestimated cooling power value.

In this study, the cooling power was measured in a clear, windless and cloudless early autumn morning. Indeed, the thermal storage of the aluminum plate substrate might have enlarged the measured cooling power. Recording adequately the environmental parameters during the cooling power measurement can help correct the measured value.

To eliminate the influence of the substrate on the measured cooling power, we can theoretically calculate the net cooling power based on the actual surface temperature of the coating, solar intensity and DLR intensity. For example, as shown in FIG. 3D, when the coating's surface temperature reaches the ambient air temperature (21.3° C.), according to the measured solar intensity of 727 $W/m^{-2}$ and DLR intensity of 304 $W/m^{-2}$, we can calculate that the net cooling power of the SSRC coating to be about 64.5 $W/m^{-2}$.

Experimental Procedure: Artificial Accelerated Weathering Tests

The artificial accelerated weathering resistance of the coating was tested using a xenon-lamp weather resistance test chamber (SN-66, Beijing Beifang Lihui Test Instrument Equipment Co., Ltd.) according to ISO (International Organization for Standardization) 11341-2004 (Paints and varnishes-Artificial weathering and exposure to artificial radiation-Exposure to filtered xenon-arc radiation). The upper surfaces of the coating specimens were exposed to the light source and sprayed with water using an 18/102 spray cycle (18 min of water spray/102 min of dryness). The exposure was stopped after 480 h and completed after 960 h, and the differences in appearance of the unexposed and exposed test specimens were visually observed, compared, and recorded. Additionally, the spectral reflectance values of the samples were measured again after each artificial accelerated weathering test period.

Experimental Procedure: Characterization of Hydrophobicity and Chemical Tolerance of the SSRC Coating To characterize the hydrophobicity and self-cleaning property of the SSRC coating, a video-based contact-angle measurement system (OCA 15EC, DataPhysics Instruments GmbH, Germany) was used to measure the static contact angles using a sessile drop method. The liquid droplet volume was 3 µL for the contact-angle measurements. The reported contact angles of different probing liquids are the average of 10 parallel measurements at different places on the coating surface.

To evaluate the surface free energy (SFE) of the coating, n-octane (99%, Tianjin Damao Reagent Company) was used as the non-polar liquid, and distilled water and formamide (>99.5%, MYM Biological Technology Company Limited) were selected as the polar liquids. These three probing liquids were employed to measure the contact angles on the flat coating surface and the Good-Van Oss-Chaudhury theory was adopted to compute the SFE and its dispersive and polar components.

Figure 14:
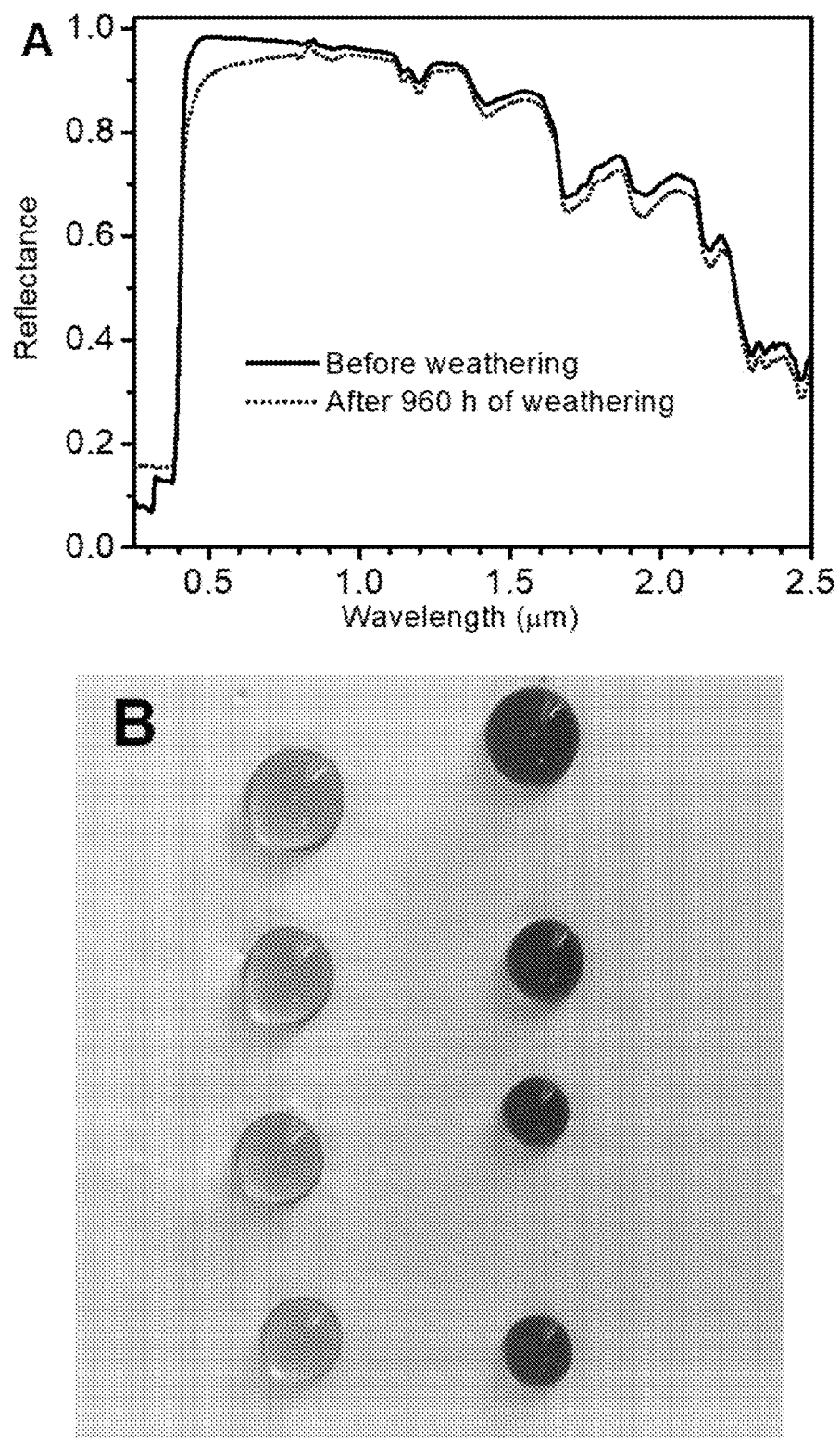
FIG. 14 depicts weathering resistance, hydrophobicity as well as the chemical tolerance of the SSRC coating Spectral reflectance curves for the coating in the unexcited state. (A) Before artificial accelerated weathering tests, after weathering for 960 h. (B) Measured water contact angles on the SSRC coating surface. (C) Measured contact angles of formamide on the SSRC coating surface. (D) Image of different solution liquid droplets on the flat surface of the coating after 30 min.
Figure 14:
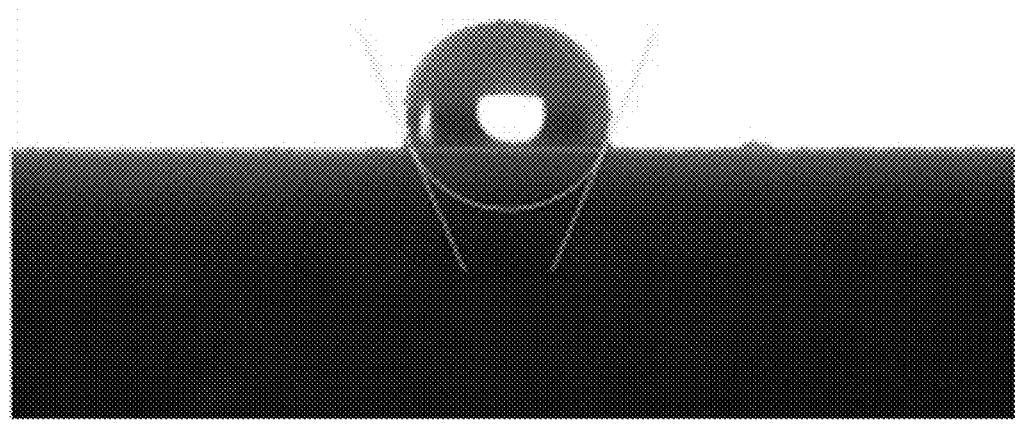
Figure 14:
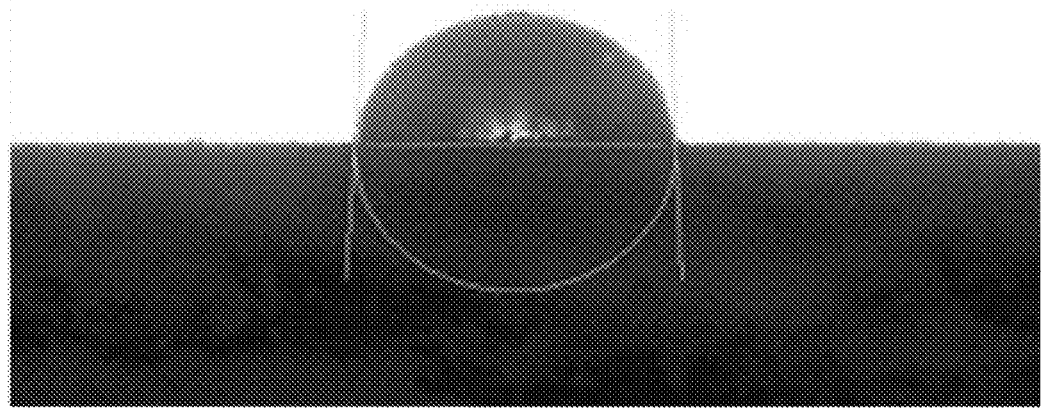

Clearly, to maximize the benefits of the coating with sub-ambient day time cooling, it is of practical significance to make the coating self-cleaning. FIG. 14 shows the images of the contact angles of water and formamide on the coating surface.

To discern the nature of hydrophobicity of the coating developed in this work, the Good-Van Oss-Chaudhury theory, also referred to as acid-base theory, is used to compute the SFE components of the coating. According to this theory, the overall SFE (γ) of any material may be obtained as follows:

$$\gamma = \gamma^{LW} + \gamma^{AB} \tag{11}$$

and $$\gamma^{AB} = 2\sqrt{\gamma^+ \gamma^-} \tag{12}$$

where $\gamma^{LW}$ is the dispersive component, also referred to as the non-polar or the Lifshitz-Van der Waals (LW) component; $\gamma^{AB}$ is the polar (acid/base) component that comprises the Lewis acid component γ+ and the Lewis base component γ-.

The measured contact angles of water, formamide, and n-octane on the flat coating surface were (109.4±1.5)°, (83.4±1.9)°, and 0°, respectively. Consequently, the computed SFE of the coating was 21.62 mN/m. The dispersive component SFE was 21.62 mN/m and that of the polar component was 0 mN/m, with those of the Lewis acid and base components being 0.27 and 0 mN/m, respectively. Theoretically, the acid component indicates a surface's propensity to have polar interactions with a second surface that has the ability to act basic by donating electrons; conversely, the base component describes a surface's inclination to have polar interactions with another surface that acts acidic by accepting electrons. Because the SFEs of the Lewis acid and base components were 0.27 and 0 mN/m, respectively, the hydrophobicity of the coating should have outstanding acid and alkali resistance. FIG. 14B vividly illustrates the static wetting properties of different liquid droplets. The green and red droplets were hydrochloric acid (1 mol/L)+methyl violet indicator and sodium hydroxide (1 mol/L)+phenolphthalein indicator, respectively. As observed in FIG. 14B, the liquid droplets resting on the coating surface remained spherical, obviously showing good chemical tolerance.

In this study, a maximum temperature reduction of 6° C. was achieved on the well-insulated small device while 8° C. was achieved on the scale-model building. The stronger cooling effect observed on the scale-model building is mainly due to its bulky dimension, which has a 10 cm thick concrete roof beneath the SSRC coating. However, the well-insulated small device only has a 1 cm thick aluminum plate beneath the SSRC coating. When exposed to direct sunshine, the SSRC coating on the concrete roof of the scale-model building exhibits a more pronounced SDRC effect than that on the aluminum or copper plate, which can be well explained using the lumped-parameter model:

$$\ln\frac{T_s - T_{amb}}{T_0 - T_{amb}} = -\frac{Ah_c}{\rho c V}t \tag{8}$$

where $T_0$ is the initial surface temperature, and $T_s$ is the surface temperature at time t, $T_{amb}$ is the ambient air temperature, $h_c$ is the device's convection and conduction coefficients; and ρ, c, A and V are the density, specific heat capacity, surface area and volume of the substrate, respectively.

For a substrate with thickness d, Eq. (8) can be rewritten as follows:

$$\ln\frac{T_s - T_{amb}}{T_0 - T_{amb}} = -\frac{h_c}{\rho c d}t \quad (13)$$

Thus, the cooling effect of a surface depends on the density, specific heat capacity, and thickness of the substrate.

With the substitution of the thickness, density and specific heat capacity of the aluminum plate and concrete substrate used in our experiment, Eq. (2) can be rewritten for the two substrates, respectively, as follows:

For aluminum plate:

$$2.4 \times 10^4 \times \ln\frac{T_s - T_{amb}}{T_0 - T_{amb}} = -h_c t \quad (9)$$

For concrete substrate:

$$3.64 \times 10^5 \times \ln\frac{T_s - T_{amb}}{T_0 - T_{amb}} = -h_c t \quad (14)$$

For identical $h_c$ and t values, the two equations show that the sub-ambient temperature reduction ($T_s - T_{amb}$) of the SSRC coating on the concrete roof is much higher than that on the aluminum plate.

What is claimed is:

1. A smart sub-ambient radiative cooling (SSRC) coating comprising TiO$_2$ particles; inorganic particles selected from the group consisting of glass, SiO$_2$, CaCO$_3$, SiC, ZnO, Al$_2$O$_3$, BaSO$_4$, Si$_3$N$_4$, and mixtures thereof; fluorescent pigment particles; and a polymer, wherein the TiO$_2$ particles have a particle size of 0.1 µm to 0.6 µm, the inorganic particles have a particle size of 10 µm to 150 µm, the fluorescent pigment particles have a particle size of 10 µm to 150 µm, the fluorescent pigment particles have a fluorescence emission between 450 to 700 nm, and the TiO$_2$ particles, inorganic particles, fluorescent pigment particles, and the polymer are present in a mass ratio of 4-5:0.5-1.5:2-3:6-7, respectively, and wherein the SSRC coating has a broadband emissivity of about 0.90 between 3 to 50 µm.

2. The SSRC coating of claim 1, wherein the SSRC coating has an infrared emissivity of greater than 0.90 between 3 to 16 µm.

3. The SSRC coating of claim 1, wherein the TiO$_2$ particles comprise a rutile crystal structure, an anatase crystal structure, or a mixture thereof.

4. The SSRC coating of claim 1, wherein the inorganic particles comprise glass.

5. The SSRC coating of claim 4, wherein the inorganic particles comprise hollow glass microspheres.

6. The SSRC coating of claim 1, wherein the fluorescent pigment particles comprise a rare earth metal doped LuPO$_4$, rare earth metal doped Sr$_2$MgSi$_2$O$_7$, rare earth metal doped CaAl$_2$O$_4$, rare earth metal doped MgAl$_2$O$_4$, rare earth metal doped BaAl$_2$O$_4$, rare earth metal doped SrAl$_2$O$_4$, or a mixture thereof.

7. The SSRC coating of claim 6, wherein the rare earth metal is Eu and optionally one or more of co-dopants selected from the group consisting of Dy, Yb, and Tb.

8. The SSRC coating of claim 1, wherein the fluorescent pigment particles comprise SrAl$_2$O$_4$:Eu$^{2+}$, Dy$^{3+}$, Yb$^{3+}$.

9. The SSRC coating of claim 1, wherein the polymer comprises polystyrene, polyacrylate, polyalkylacrylate, polymethacrylate, polyalkylmethacrylate, polycarbonate, polyacryclic acid, polymethacrylic acid, and mixtures thereof, and copolymers thereof.

10. The SSRC coating of claim 1, wherein the polymer comprises poly(styrene-co-butylacrylate).

11. The SSRC coating of claim 1 further comprising a wetting agent, a dispersant agent, an antifoaming agent, a suspending agent, a levelling agent, a coalescent agent, water, or a mixture thereof.

12. The SSRC coating of claim 1, wherein the SSRC coating has an infrared emissivity between 0.92-0.97 between 8 to 13 µm.

13. The SSRC coating of claim 1, wherein the TiO$_2$ particles comprise a rutile crystal structure; the inorganic particles comprise hollow glass microspheres; and the fluorescent pigment particles comprise SrAl$_2$O$_4$:Eu$^{2+}$,Dy$^{3+}$, Yb$^{3+}$.

14. The SSRC coating of claim 13, wherein the SSRC coating has an infrared emissivity between 0.92-0.97 between 8 to 13 µm.

15. The SSRC coating of claim 13, wherein the TiO$_2$ particles; the hollow glass microspheres; SrAl$_2$O$_4$:Eu$^{2+}$, Dy$^{3+}$,Yb$^{3+}$; and the polymer are present in a mass ratio of 4-5:0.5-1.5:2-3:6-7, respectively.

16. The SSRC coating of claim 15, wherein the SSRC coating has an infrared emissivity of 0.94-0.96 between 8 to 13 µm.

17. The SSRC coating of claim 15 further comprising a wetting agent, a dispersant agent, an antifoaming agent, a suspending agent, a levelling agent, a coalescent agent, water, or a mixture thereof.

18. A SSRC coating formulation comprising the SSRC coating of claim 1 and one or more solvents.

19. A method of applying the SSRC coating formulation of claim 18 to a surface of a substrate, the method comprising: applying the SSRC coating formulation to the surface of the substrate thereby forming a SSRC coating on the surface of the substrate; and optionally curing the SSRC coating.

* * * * *